United States Patent (10) Patent No.: US 11,917,588 B2
Sun et al. (45) Date of Patent: Feb. 27, 2024

(54) CONFIGURED COMMUNICATIONS TECHNIQUES IN SHARED RADIO FREQUENCY SPECTRUM BASED ON CHANNEL OCCUPANCY TIME

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Juan Montojo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/216,579

(22) Filed: Mar. 29, 2021

(65) Prior Publication Data

US 2021/0306991 A1 Sep. 30, 2021

Related U.S. Application Data

(60) Provisional application No. 63/002,436, filed on Mar. 31, 2020.

(51) Int. Cl.
*H04W 72/044* (2023.01)
*H04W 74/02* (2009.01)
*H04W 72/23* (2023.01)
*H04W 72/51* (2023.01)

(52) U.S. Cl.
CPC ........ *H04W 72/044* (2013.01); *H04W 72/23* (2023.01); *H04W 72/51* (2023.01); *H04W 74/02* (2013.01)

(58) Field of Classification Search
CPC ... H04W 72/044; H04W 72/23; H04W 72/51; H04W 74/02; H04W 74/006; H04W 74/0808
See application file for complete search history.

(56) References Cited

U.S. PATENT DOCUMENTS

| 2020/0045696 | A1* | 2/2020 | Huang | H04W 16/14 |
| 2021/0051712 | A1* | 2/2021 | Hedayat | H04W 16/14 |
| 2022/0094497 | A1* | 3/2022 | Shibaike | H04L 1/0026 |
| 2022/0338262 | A1* | 10/2022 | He | H04W 48/16 |

FOREIGN PATENT DOCUMENTS

WO WO-2020144402 A1 * 7/2020 ........... H04L 5/0053

* cited by examiner

*Primary Examiner* — Ivan O Latorre
(74) *Attorney, Agent, or Firm* — Holland & Hart LLP

(57) ABSTRACT

Methods, systems, and devices for wireless communications are described in which a user equipment (UE) may be provided with a set of configured resources that use shared radio frequency spectrum. A base station may perform a listen-before-talk (LBT) procedure to verify that a channel is available for transmissions, and may determine a channel occupancy time (COT) during which associated resources are reserved by the base station. An indication of the resources associated with the COT may be provided by the base station to the UE. The UE may then validate the configured resources based on whether they are located within resources associated with the COT.

20 Claims, 18 Drawing Sheets

CONFIGURED COMMUNICATIONS TECHNIQUES IN SHARED RADIO FREQUENCY SPECTRUM BASED ON CHANNEL OCCUPANCY TIME

CROSS REFERENCE

The present Application for patent claims the benefit of U.S. Provisional Patent Application No. 63/002,436 by SUN et al., entitled "CONFIGURED COMMUNICATIONS TECHNIQUES IN SHARED RADIO FREQUENCY SPECTRUM BASED ON CHANNEL OCCUPANCY TIME," filed Mar. 31, 2020, assigned to the assignee hereof, and expressly incorporated by reference herein.

FIELD OF TECHNOLOGY

The following relates generally to wireless communications and to configured communications techniques in shared radio frequency spectrum based on channel occupancy time.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configured communications techniques in shared radio frequency spectrum based on channel occupancy time. In accordance with various aspects, a base station may configure a user equipment (UE) with a set of configured resources that may be used for communications between the UE and the base station (e.g., periodic resources for uplink or downlink communications) without a separate resource grant that is associated with each communication. In some cases, when using shared radio frequency spectrum, a transmitting device (e.g., a base station or UE) may perform a listen-before-talk (LBT) procedure to verify that a channel is available for transmissions. In some cases, a channel occupancy time (COT) associated with the LBT procedure may be provided by the transmitting device to the receiving device. In cases where the receiving device (e.g., a UE) has configured resources, communications using the configured resources may be validated based on whether they are located within resources associated with the COT. In cases where the configured resources are not located within the resources associated with the COT (e.g., within COT time and frequency resources), the communications on such configured resources may be canceled.

A method of wireless communication at a UE is described. The method may include receiving, from a base station, configuration information that indicates wireless resources for a set of communications with the base station, each of the set of communications having an associated wireless resource that includes a time domain resource and a frequency domain resource, monitoring for a channel occupancy time indication from the base station that indicates wireless resources within a shared radio frequency spectrum band that are reserved by the base station, and determining whether to cancel a first communication of the set of communications based on one or more of the channel occupancy time indication being undetected, or a first wireless resource of the first communication being outside of the wireless resources indicated in a detected channel occupancy time indication.

An apparatus for wireless communication at a UE is described. The apparatus may include a processor, memory coupled with the processor, and instructions stored in the memory. The instructions may be executable by the processor to cause the apparatus to receive, from a base station, configuration information that indicates wireless resources for a set of communications with the base station, each of the set of communications having an associated wireless resource that includes a time domain resource and a frequency domain resource, monitor for a channel occupancy time indication from the base station that indicates wireless resources within a shared radio frequency spectrum band that are reserved by the base station, and determine whether to cancel a first communication of the set of communications based on one or more of the channel occupancy time indication being undetected, or a first wireless resource of the first communication being outside of the wireless resources indicated in a detected channel occupancy time indication.

Another apparatus for wireless communication at a UE is described. The apparatus may include means for receiving, from a base station, configuration information that indicates wireless resources for a set of communications with the base station, each of the set of communications having an associated wireless resource that includes a time domain resource and a frequency domain resource, monitoring for a channel occupancy time indication from the base station that indicates wireless resources within a shared radio frequency spectrum band that are reserved by the base station, and determining whether to cancel a first communication of the set of communications based on one or more of the channel occupancy time indication being undetected, or a first wireless resource of the first communication being outside of the wireless resources indicated in a detected channel occupancy time indication.

A non-transitory computer-readable medium storing code for wireless communication at a UE is described. The code may include instructions executable by a processor to receive, from a base station, configuration information that indicates wireless resources for a set of communications with the base station, each of the set of communications having an associated wireless resource that includes a time domain resource and a frequency domain resource, monitor for a channel occupancy time indication from the base station that indicates wireless resources within a shared radio frequency spectrum band that are reserved by the base station, and determine whether to cancel a first communication of the set of communications based on one or more of the channel occupancy time indication being undetected, or a first wireless resource of the first communication being outside of the wireless resources indicated in a detected channel occupancy time indication.

In some examples of the method, apparatuses, and non-transitory computer-readable medium described herein, the configuration information may be provided in RRC signaling that configures a set of periodic uplink transmissions, a set of periodic downlink transmissions, or combinations thereof. In some examples of the method, apparatuses, and non-transitory computer-readable medium described herein, the configuration information includes an indication that enables the determining whether to cancel based on the channel occupancy time indication.

In some examples of the method, apparatuses, and non-transitory computer-readable medium described herein, the configuration information includes a common indication that both uplink and downlink communications are to be canceled when the channel occupancy time indication is undetected. In some examples of the method, apparatuses, and non-transitory computer-readable medium described herein, the configuration information includes an uplink validation indication that indicates uplink communications are to be canceled when the channel occupancy time indication is undetected, and a downlink validation indication that indicates whether downlink communications are to be canceled when the channel occupancy time indication is undetected.

Some examples of the method, apparatuses, and non-transitory computer-readable medium described herein may further include operations, features, means, or instructions for receiving, from the base station, a slot format indicator (SFI) that indicates a slot format associated with the channel occupancy time indication, the SFI indicating a transmission direction of a set of symbols within the channel occupancy time, and where the determining is further based on comparing a transmission direction of a first symbol of the first communication with a corresponding transmission direction indicated for the first symbol in the SFI.

In some examples of the method, apparatuses, and non-transitory computer-readable medium described herein, a detection of the channel occupancy time indication from the base station indicates that the base station is using a beam direction that enables communications between the UE and the base station. In some examples of the method, apparatuses, and non-transitory computer-readable medium described herein, the determining is further based on a timing of detection of the channel occupancy time indication, and where the first communication is canceled when the channel occupancy time indication is received less than a time threshold before a transmission time of the first communication. In some examples of the method, apparatuses, and non-transitory computer-readable medium described herein, the time threshold may be a N2 time threshold that corresponds to a UE processing capability for a minimum time gap between receiving an uplink grant and transmitting a corresponding uplink shared channel communication.

In some examples of the method, apparatuses, and non-transitory computer-readable medium described herein, the first communication is canceled when a transmission time of the first communication is outside of the indicated channel occupancy time, when a frequency resource of the first communication is outside of a frequency band of the indicated channel occupancy time, or combinations thereof. In some examples of the method, apparatuses, and non-transitory computer-readable medium described herein, the configuration information further indicates whether the set of communications with the base station is conditioned on detection of the channel occupancy time indication. In some examples of the method, apparatuses, and non-transitory computer-readable medium described herein, the configuration information further indicates a first set of wireless resources in which associated configured communications are transmitted irrespective of detection of the channel occupancy time indication, and a second set of wireless resources in which associated configured communications are conditioned on detection of the channel occupancy time indication.

A method of wireless communication at a base station is described. The method may include transmitting, to at least a first UE, configuration information that indicates wireless resources for a set of communications between the base station and the UE, each of the set of communications having an associated wireless resource that includes a time domain resource and a frequency domain resource, performing a listen-before-talk procedure to determine an availability of a shared radio frequency spectrum band for at least a first communication of the set of communications, and transmitting, responsive to determining that the shared radio frequency spectrum band is available for at least the first communication, a channel occupancy time indication to at least the first UE, where the channel occupancy time indication is used to determine whether to cancel the first communication.

An apparatus for wireless communication at a base station is described. The apparatus may include a processor, memory coupled with the processor, and instructions stored in the memory. The instructions may be executable by the processor to cause the apparatus to transmit, to at least a first UE, configuration information that indicates wireless resources for a set of communications between the base station and the UE, each of the set of communications having an associated wireless resource that includes a time domain resource and a frequency domain resource, perform a listen-before-talk procedure to determine an availability of a shared radio frequency spectrum band for at least a first communication of the set of communications, and transmit, responsive to determining that the shared radio frequency spectrum band is available for at least the first communication, a channel occupancy time indication to at least the first UE, where the channel occupancy time indication is used to determine whether to cancel the first communication.

Another apparatus for wireless communication at a base station is described. The apparatus may include means for transmitting, to at least a first UE, configuration information that indicates wireless resources for a set of communications between the base station and the UE, each of the set of communications having an associated wireless resource that includes a time domain resource and a frequency domain resource, performing a listen-before-talk procedure to determine an availability of a shared radio frequency spectrum band for at least a first communication of the set of communications, and transmitting, responsive to determining that the shared radio frequency spectrum band is available for at least the first communication, a channel occupancy time indication to at least the first UE, where the channel occupancy time indication is used to determine whether to cancel the first communication.

A non-transitory computer-readable medium storing code for wireless communication at a base station is described.

The code may include instructions executable by a processor to transmit, to at least a first UE, configuration information that indicates wireless resources for a set of communications between the base station and the UE, each of the set of communications having an associated wireless resource that includes a time domain resource and a frequency domain resource, perform a listen-before-talk procedure to determine an availability of a shared radio frequency spectrum band for at least a first communication of the set of communications, and transmit, responsive to determining that the shared radio frequency spectrum band is available for at least the first communication, a channel occupancy time indication to at least the first UE, where the channel occupancy time indication is used to determine whether to cancel the first communication.

In some examples of the method, apparatuses, and non-transitory computer-readable medium described herein, the configuration information may be provided in RRC signaling that configures a set of periodic uplink transmissions, a set of periodic downlink transmissions, or combinations thereof. In some examples of the method, apparatuses, and non-transitory computer-readable medium described herein, the configuration information includes an indication to the first UE that enables cancelling the first communication based on the channel occupancy time indication being undetected. In some examples of the method, apparatuses, and non-transitory computer-readable medium described herein, the configuration information includes a common indication that both uplink and downlink communications are to be canceled at the first UE when the channel occupancy time indication is undetected. In some examples of the method, apparatuses, and non-transitory computer-readable medium described herein, the configuration information includes an uplink validation indication that indicates uplink communications are to be canceled at the first UE when the channel occupancy time indication is undetected, and a downlink validation indication that indicates whether downlink communications are to be canceled at the first UE when the channel occupancy time indication is undetected.

Some examples of the method, apparatuses, and non-transitory computer-readable medium described herein may further include operations, features, means, or instructions for transmitting, to the first UE, a slot format indicator (SFI) that indicates a slot format associated with the channel occupancy time indication, the SFI indicating a transmission direction of a set of symbols within the channel occupancy time, and determining whether the first communication is canceled based on comparing a transmission direction of a first symbol of the first communication with a corresponding transmission direction indicated for the first symbol in the SFI.

In some examples of the method, apparatuses, and non-transitory computer-readable medium described herein, the channel occupancy time indication is transmitted from the base station in a beam direction associated with the indicated channel occupancy time, and where one or more UEs outside of the beam direction that do not detect the channel occupancy time indication are to cancel associated configured communications with the base station.

In some examples of the method, apparatuses, and non-transitory computer-readable medium described herein, the configuration information further indicates a time threshold between the first communication and a timing of detection of the channel occupancy time indication, and where the first communication is canceled when the channel occupancy time indication is transmitted less than the time threshold before a transmission time of the first communication. In some examples of the method, apparatuses, and non-transitory computer-readable medium described herein, the time threshold may be a N2 time threshold that corresponds to a UE processing capability for a minimum time gap between receiving an uplink grant and transmitting a corresponding uplink shared channel communication.

In some examples of the method, apparatuses, and non-transitory computer-readable medium described herein, the first communication is canceled when a transmission time of the first communication is outside of the indicated channel occupancy time, when a frequency resource of the first communication is outside of a frequency band of the indicated channel occupancy time, or combinations thereof. In some examples of the method, apparatuses, and non-transitory computer-readable medium described herein, the configuration information further indicates whether the set of communications are conditioned on detection of the channel occupancy time indication by the first UE. In some examples of the method, apparatuses, and non-transitory computer-readable medium described herein, the configuration information further indicates a first set of wireless resources in which associated configured communications are transmitted irrespective of detection of the channel occupancy time indication, and a second set of wireless resources in which associated configured communications are conditioned on detection of the channel occupancy time indication.

DETAILED DESCRIPTION

Various aspects of the present disclosure provide for techniques that support configured communications in shared radio frequency spectrum. In some cases, a base station may configure a user equipment (UE) with a set of configured resources that may be used for a number of communications between the UE and the base station without a separate resource grant that is associated with each communication. For example, the base station may configure the UE with periodic uplink resources, downlink resources, or combinations thereof. Based on the configured resources, the UE may transmit an uplink transmission or monitor for a downlink transmission without a separate resource grant for each communication instance. Such techniques may thus enhance efficiency of a system by providing configured communications with lower overhead. However, in instances where data is not to be communicated, it may be beneficial to skip one or more configured communications, which may allow for such resources to be used for other communications and thus enhance the flexibility and efficiency of the communications system.

In accordance with various techniques as discussed herein, when using shared radio frequency spectrum, a transmitting device (e.g., a base station or UE) may perform a listen-before-talk (LBT) procedure to verify that a channel is available for transmissions. In some cases, a channel occupancy time (COT) associated with the LBT procedure may be provided by the transmitting device to the receiving device. In cases where the receiving device (e.g., a UE) has configured resources, communications using the configured resources may be validated based on whether they are located within resources associated with the COT. In cases where the configured resources are not located within the resources associated with the COT (e.g., within COT time and frequency resources), the communications on such configured resources may be canceled.

Such techniques may enhance the efficiency of a wireless communications system by allowing for configured resources, and also using such resources when they are confirmed or validated by a COT indication. Thus, overhead associated with separate resource grant transmissions may be avoided, while also allowing flexibility for skipping such configured communications in certain instances. Such techniques may thereby enhance the reliability and efficiency of the associated wireless communications network, and improve overall user experience.

Aspects of the disclosure are initially described in the context of wireless communications systems. Several examples of configured resource validation based on a COT indication and associated process flows are then discussed. Aspects of the disclosure are further illustrated by and described with reference to apparatus diagrams, system diagrams, and flowcharts that relate to configured communications techniques in shared radio frequency spectrum based on channel occupancy time.

Figure 1:
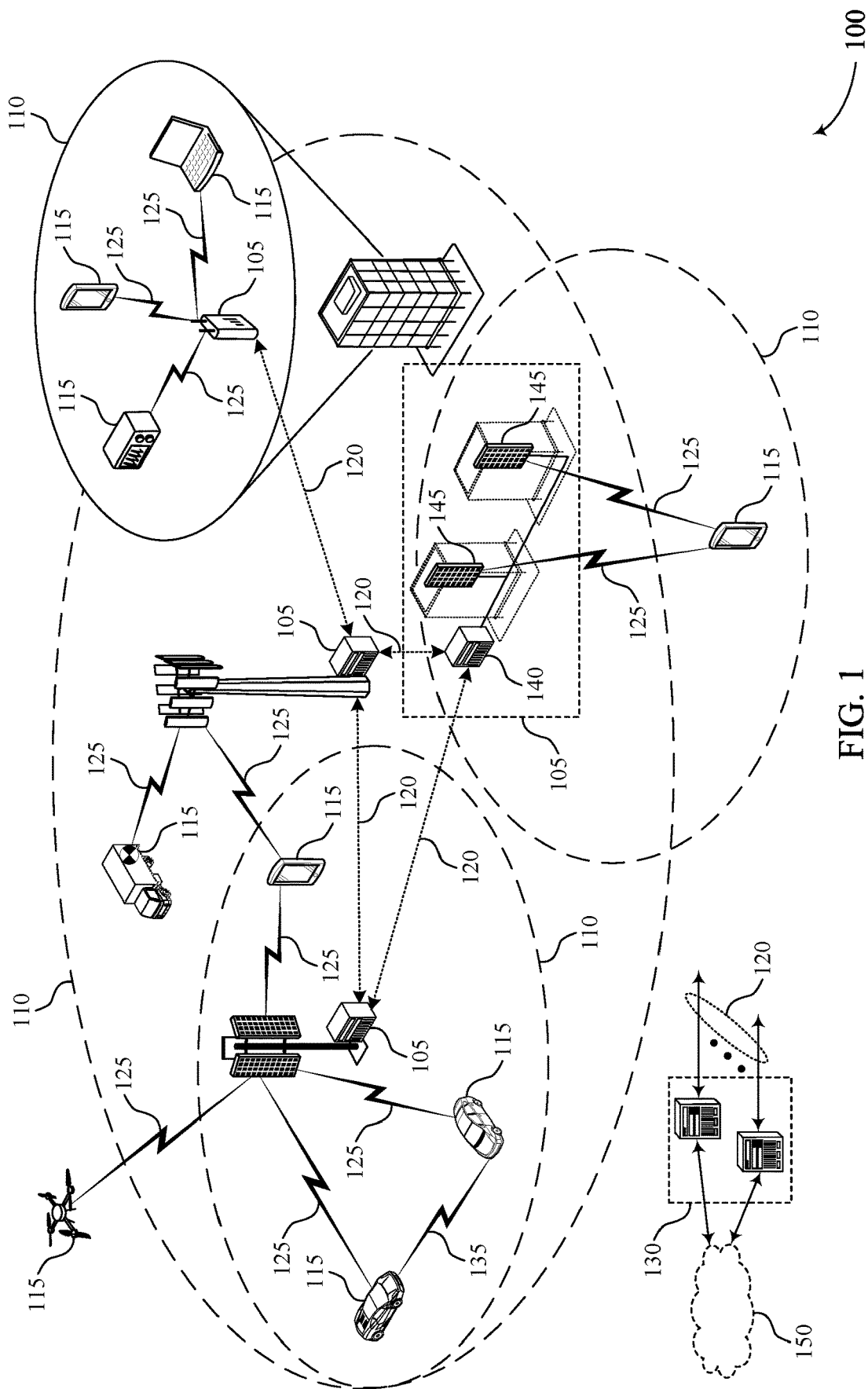
FIG. 1 illustrates an example of a system for wireless communications that supports configured communications techniques in shared radio frequency spectrum based on channel occupancy time in accordance with aspects of the present disclosure.

FIG. 1 illustrates an example of a wireless communications system 100 that supports configured communications techniques in shared radio frequency spectrum based on channel occupancy time in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more UEs 115 may be provided with a set of configured resources in which a separate resource grant associated with each of the resources is not needed in order for an associated communication to be transmitted or received. In some cases, when using shared radio frequency spectrum, a base station 105 (or UE 115) may perform a LBT procedure to verify that a channel is available for transmissions. In some cases, a COT associated with the LBT procedure may be provided by the base station 105 to one or more UEs 115. In cases where a UE 115 has configured resources, communications using the configured resources may be validated based on whether they are located within resources associated with the COT. In cases where the configured resources are not located within the resources associated with the COT (e.g., within COT time and frequency resources), the communications on such configured resources may be canceled. In cases where the configured resources are located within the resources associated with the COT, the communications on such configured resources may be validated.

Figure 2:
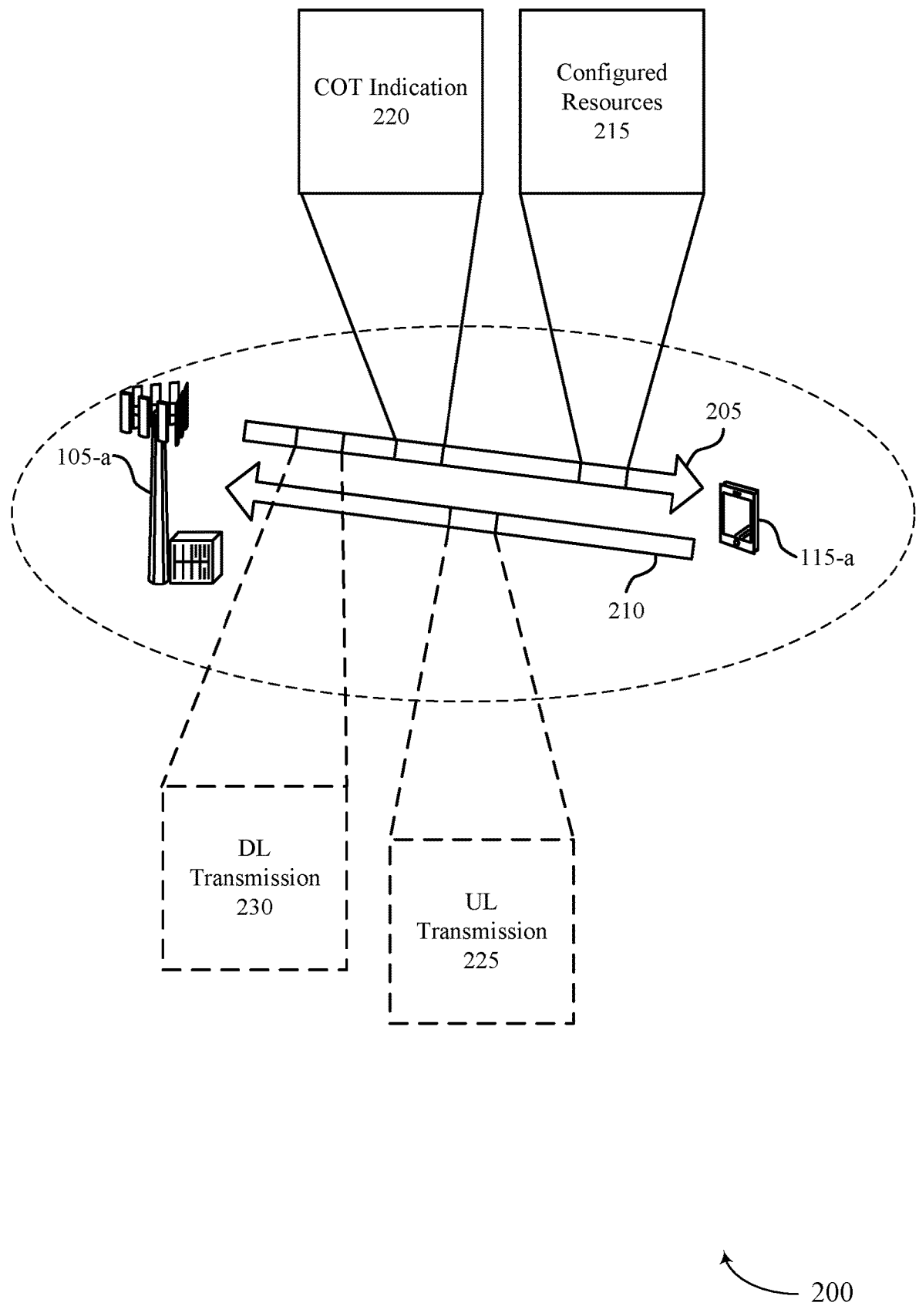
FIG. 2 illustrates an example of a portion of a wireless communications system that supports configured communications techniques in shared radio frequency spectrum based on channel occupancy time in accordance with aspects of the present disclosure.

FIG. 2 illustrates an example of a wireless communications system 200 that supports configured communications techniques in shared radio frequency spectrum based on channel occupancy time in accordance with aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1. Base station 105-a and UE 115-a may communicate using one or more directional beams, use shared radio frequency spectrum, or both.

In wireless communications system 200, base station 105-a and UE 115-a may establish a connection and communicate using downlink communications 205 and uplink communications 210. In some cases, the base station 105-a may configure the UE 115-a (e.g., via RRC signaling), with configured resources 215. The configured resources 215 may provide uplink resources for uplink transmissions 225 from the UE 115-a to the base station 105-a, downlink resources for downlink transmissions 230 from the base station 105-a to the UE 115-a, or combinations thereof. The UE 115-a, based on the configured resources 215, may perform the uplink or downlink communications in the absence of a specific resource grant from the base station 105-a, which may enhance efficiency. Further, in order to avoid using configured resources when data may not be present to be transmitted, such communications may be validated by the base station 105-a.

In some existing systems, a slot format indicator (SFI) may be provided by the network that may be used to validate a configured communication. Such a SFI may indicate whether a particular symbol within a slot is an uplink symbol, a downlink symbol, or a flexible symbol, and in the event that the SFI direction of a symbol does not match what would be necessary for the configured communication, the configured communication may be canceled. In some cases, for example, a downlink control information (DCI) format (e.g., DCI format 2_0) may be provided with SFI configured, which indicates to the UE 115-a that configured communications will need to be validated by SFI with matching direction, where configured uplink communications will be cancelled if the SFI indicates downlink or flexible, and configured downlink will be cancelled if the SFI indicates uplink or flexible. Further, if DCI 2_0 is configured, but not detected, the UE will cancel all corresponding uplink and downlink communications, except if an uplink communications is within a predetermined processing time N2 in which the uplink transmission is not expected to be cancelled.

In some cases, when using shared radio frequency spectrum, an RRC parameter (e.g., enableConfiguredUL-r16) may be provided such that if it is configured, the UE 115-a is allowed to transmit configured uplink transmissions 225 if DCI 2_0 is configured but not detected. Such a parameter may be used to allow for a configured uplink transmission 225 to be transmitted in the event it is outside of a COT that has been reserved by the base station 105-a. In such cases, the UE 115-a may use a full LBT (e.g., a Cat 4 LBT versus an abbreviated Cat 2 LBT if the transmission is within the COT) to initiate a COT to transmit the uplink transmission 230. In some cases, when the base station 105-a passes a LBT procedure, associated reserved resources (e.g., time and frequency resources) may be provided to the UE 115-a in a COT indication 220. In some cases, such a COT indication 220 may be provided in a COT duration field and availableRB-Sets field in DCI 2_0 to define the time and frequency domain range of COT.

In accordance with various aspects of the present disclosure, the COT indication 220 that provides a time duration and frequency resources (e.g., in the availableRB-Sets field) that are reserved by the base station 105-a may be used to validate configured resources at the UE 115-a. In some cases, the UE 115-a may validate a configured uplink transmission 225 or downlink transmission 230 based on the associated resources being within resources indicated by the COT indication 220, and may cancel the associated transmission if the associated resources are outside of the resources indicated by the COT indication 220. The uplink transmission 225 and the downlink transmission 230 may include any type of configured communication, such as channel state information reference signal (CSI-RS) transmissions, downlink semi-persistent scheduling (SPS) transmissions, physical uplink control channel (PUCCH) transmissions (e.g., for scheduling requests and/or CSI report), configured grant uplink transmissions, sounding reference signal (SRS) transmissions, other types of communications, or any combinations thereof. In some cases, validation of configured resources 215 based on the COT indication 220 may be controlled (e.g., based on a RRC parameter). In some cases, a common validation parameter may be used to indicate downlink validation and uplink validation, or separate RRC parameters may be used to control the downlink behavior and uplink behavior separately. In some cases, if SFI-based validation is configured, the UE 115-a may further follow SFI indicated DL/UL/flexible direction to determine cancellation or validation of configured transmission/reception within resources indicated by the COT indication 220.

Figure 3:
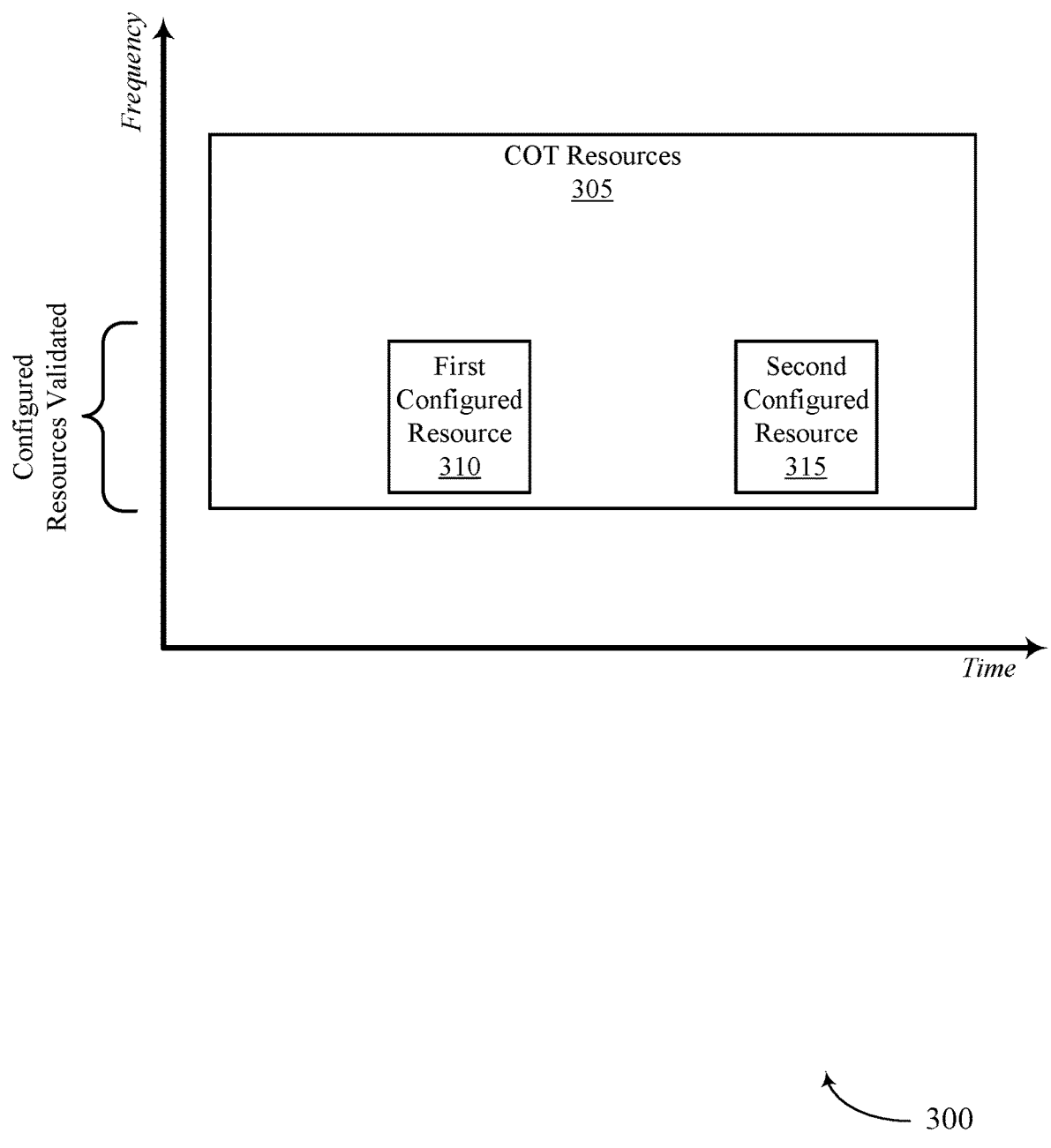
FIGS. 3 through 5 illustrate examples of channel occupancy time resources in relation to configured resources in accordance with aspects of the present disclosure.
Figure 4:
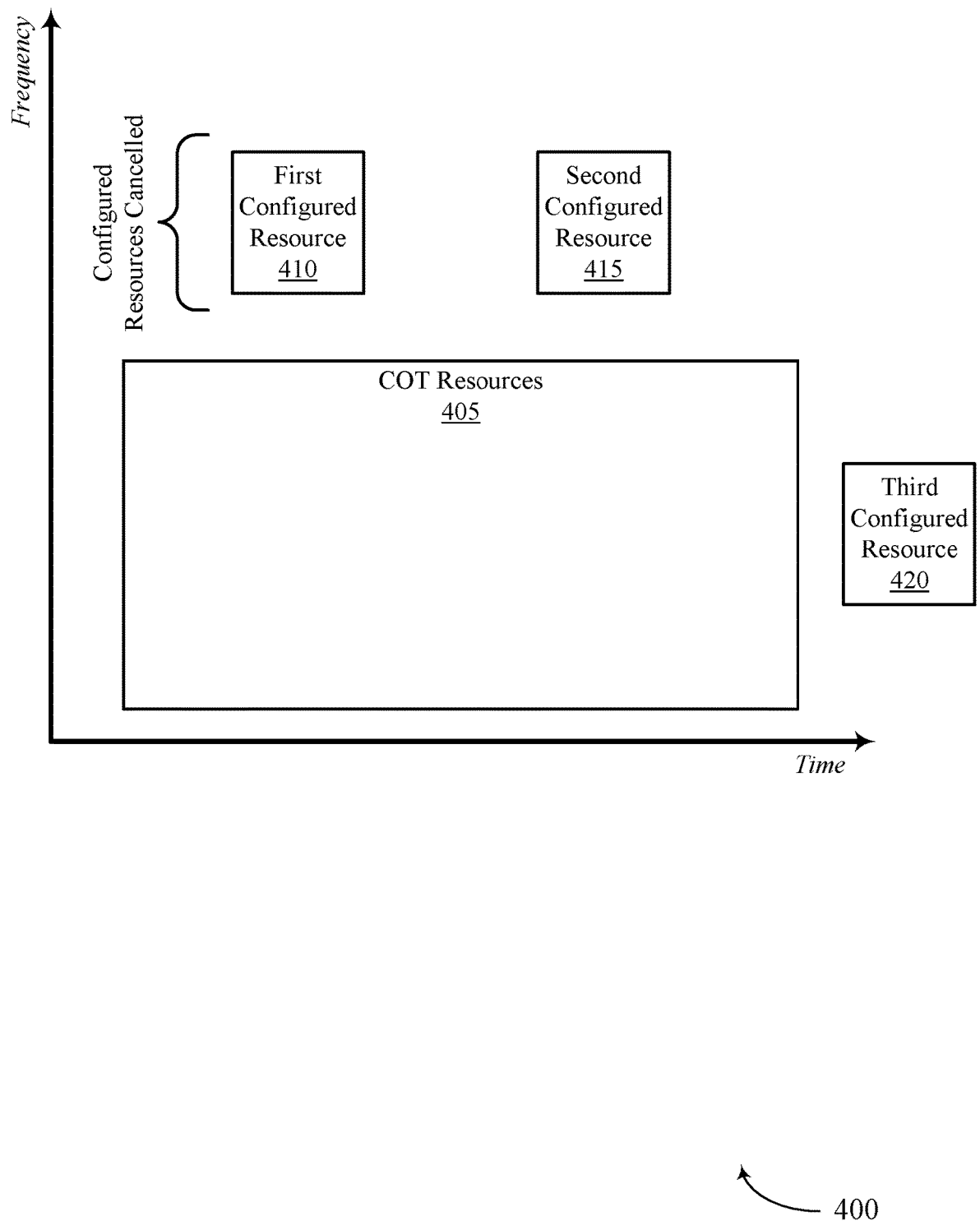
Figure 5:
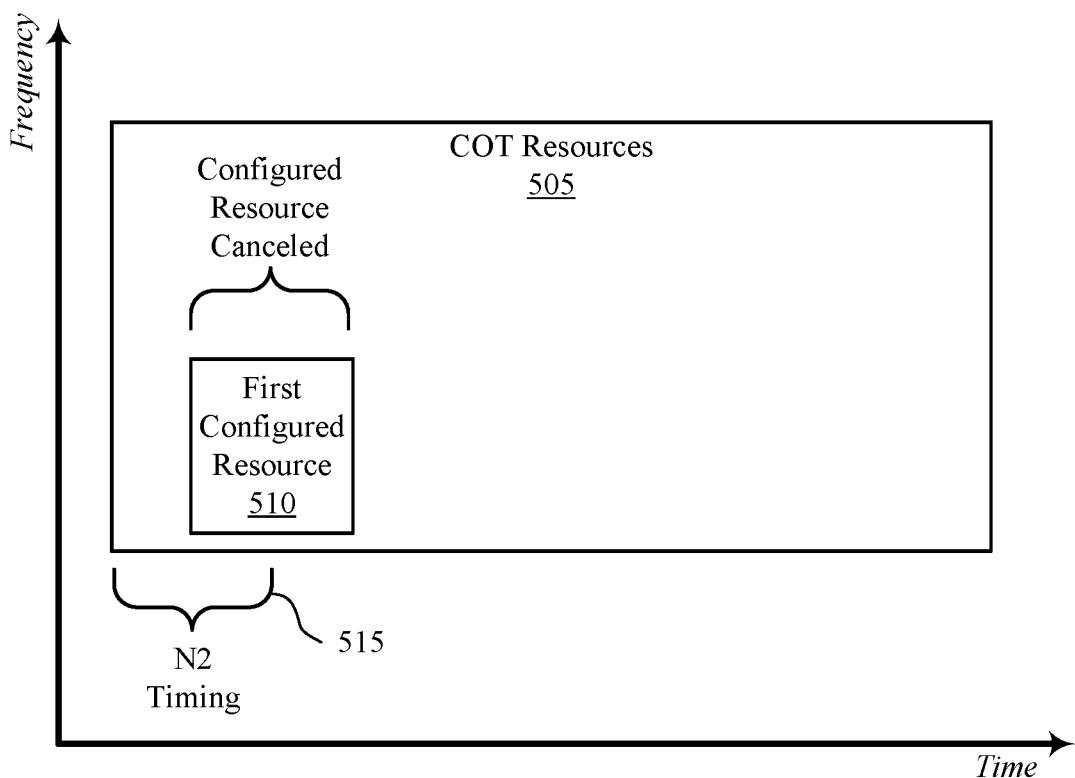

In some cases, the base station 105-a and the UE 115-a may use mmW communications, and if the UE 115-a does not detect the COT indication 220, it may indicate that the base station 105-a failed the LBT for the COT, or the base station 105-a is transmitting to some other direction and thus the COT indication 220 is not detected at the UE 115-a. In such a manner, the UE 115-a will only transmit and receive configured communications when the base station 105-a is tuned to the direction of the UE 115-a. Such techniques may provide for enhance efficiency to allow the UE 115-a to skip monitoring and transmission of communications that are not validated, which may reduce UE power consumption and also allow the base station 105-a additional flexibility to communication with other UEs or in other directions while continuing to maintain the configured resources 215. In some cases, for symbols that the UE 115-a cannot determine to be in the base station 105-a COT, the UE 115-a may cancel uplink or downlink communications (or both), but still monitor PDCCH. Further, in some cases, at the beginning of the COT, such as within a N2 timeline, since the UE 115-a has not yet determined the symbols that are in COT due to the processing delay of COT system information (COT-SI), the UE may cancel configured communications. Further, in some cases, whether to use COT-based validation of configured resources may be enabled at the UE 115-a for all RRC configured resources. Additionally, in some cases, finer resolution control may be provided, such as a per-configuration process control, or based on time domain patterns (e.g., COT-based validation for certain subframes or frames). FIGS. 3 through 5 provide several examples of COT-based validation/cancellation of configured resources, with the understanding that such examples are provided for purposes of illustration and discussion only, and that numerous other examples are within the scope of the techniques described herein.

FIG. 3 illustrates an example of a COT in relation to configured resources 300 that supports configured communications techniques in shared radio frequency spectrum based on channel occupancy time in accordance with aspects of the present disclosure. In some examples, COT and configured resources 300 may be implemented in aspects of wireless communications system 100 or 200.

In this example, a base station may perform a LBT procedure and identify COT resources 305. Further, the base station and a served UE may have previously configured resources for uplink or downlink communications, which may include first configured resource 310 (e.g., a RRC configured uplink or downlink resource) and a second configured resource 315 (e.g., a RRC configured uplink or downlink resource). In response to passing the LBT, the base station may provide an indication of the COT resources 305 to the served UE, which may provide an indication of time and frequency resources associated with the COT. The UE, based on the COT indication, may determine that both the first configured resource 310 and the second configured resource 315 are within the COT resources 305, and may validate the configured resources. The base station and UE may proceed to communicate using the first configured resource 310 and the second configured resource 315.

FIG. 4 illustrates an example of a COT in relation to configured resources 400 that supports configured communications techniques in shared radio frequency spectrum based on channel occupancy time in accordance with aspects of the present disclosure. In some examples, COT and configured resources 400 may be implemented in aspects of wireless communications system 100 or 200.

In this example, a base station may perform a LBT procedure and identify COT resources 405. Further, the base station and a served UE may have previously configured resources for uplink or downlink communications, which may include first configured resource 410 (e.g., a RRC configured uplink or downlink resource), a second configured resource 415 (e.g., a RRC configured uplink or downlink resource), and a third configured resource 420 (e.g., a RRC configured uplink or downlink resource). In response to passing the LBT, the base station may provide an indication of the COT resources 405 to the served UE, which may provide an indication of time and frequency resources associated with the COT. The UE, based on the COT indication, may determine that none of the first configured resource 410, second configured resource 415, or third configured resource 420, are within the COT resources 405, and may thus cancel the configured resources. In this example, the first configured resource 410 and the second configured resource 415 may occur within the time domain resources of the COT resources 405, but are outside of the associated frequency domain resources (e.g., as indicated in a availableRB-Sets field in a DCI that indicates the COT resources 405). Further, in this example, the third configured resource 420 may occur outside of the time domain resources of the COT resources 405.

FIG. 5 illustrates an example of a COT in relation to configured resources 500 that supports configured communications techniques in shared radio frequency spectrum based on channel occupancy time in accordance with aspects of the present disclosure. In some examples, COT and configured resources 500 may be implemented in aspects of wireless communications system 100 or 200.

In this example, a base station may perform a LBT procedure and identify COT resources 505. Further, the base station and a served UE may have previously configured resources for uplink or downlink communications, which may include first configured resource 510 (e.g., a RRC configured uplink or downlink resource). In response to passing the LBT, the base station may provide an indication of the COT resources 505 to the served UE, which may provide an indication of time and frequency resources associated with the COT. In this example, the first configured resource 510 occurs less than a configured N2 timing 515 of the UE, and the first configured resource 510 is canceled because it is within the COT-SI processing period of the UE. Thus, even though the first configured resource 510 is within the COT resources 505, it is canceled based on the N2 timing 515.

Figure 6:
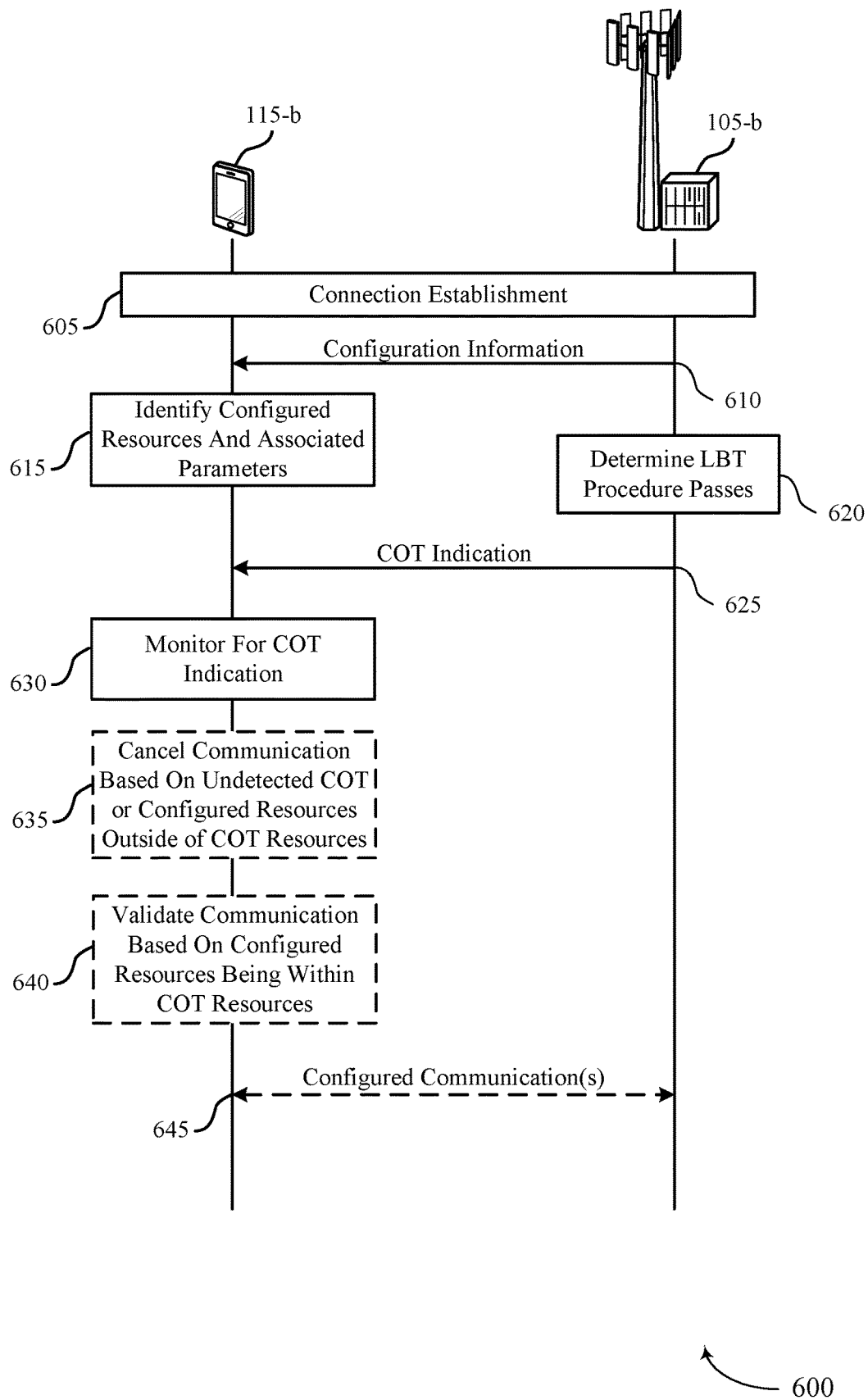
FIG. 6 illustrates an example of a process flow that supports configured communications techniques in shared radio frequency spectrum based on channel occupancy time in accordance with aspects of the present disclosure.

FIG. 6 illustrates an example of a process flow 600 that supports configured communications techniques in shared radio frequency spectrum based on channel occupancy time in accordance with aspects of the present disclosure. In some examples, process flow 600 may implement aspects of wireless communications system 100 or 200. Process flow 600 may be implemented by UE 115-b and base station 105-b, as described herein. Alternative examples of the following may be implemented, where some steps are performed in a different order than described or are not performed at all. In some cases, steps may include additional features not mentioned below, or further steps may be added.

At 605, the base station 105-b and the UE 115-b may perform a connection establishment to establish communications. Such a connection establishment may be performed in accordance with established connection establishment procedures (e.g., random access procedures to establish a RRC connection). In some cases, the connection between the UE 115-a and the base station 105-a may use shared radio frequency spectrum. Further, in some cases, the connection may use beamformed communications.

The base station 105-b, in some cases, may determine that configured resources are to be established for the UE 115-b (e.g., based on a request from the UE 115-b, based on a communications pattern or SPS configuration). The base station 105-b may determine the configured resources and, at 610, transmit configuration information to the UE 115-b to configure the resources. In some cases, the configuration information may also enable or disable COT-based validation/cancellation of configured resources. At 615, the UE 115-b may identify the configured resources and associated parameters. Further, the UE 115-b may determine whether COT-based validation/cancellation of configured resources is enabled or disabled.

At 620, the base station 105-b may perform a LBT procedure and determine that LBT has passed. Based on the LBT, the base station 105-b may determine a channel occupancy time and associated frequency resources that are reserved based on the LBT procedure. At 625, the base station 105-b may transmit the COT indication to the UE 115-b. At 630, the UE 115-b may monitor for the COT indication. In some cases, the COT indication may be provided in a DCI transmission that is transmitted by the base station 105-a upon passing LBT for a radio frame or other time period, and the UE 115-b may be configured to monitor for the DCI based on the radio frame or other time period.

At 635, the UE 115-b may determine that the COT indication is not detected, or may detect the COT and determine that the configured resources are outside of the COT resources. In such cases, the UE 115-b may cancel the associated configured communication. At 640, the UE 115-b may determine that the COT indication is detected, and that the configured resources are within the associated COT resources, and thus validate the configured communications. At 645, the configured communications may be transmitted and received based on the validation of the configured resources. In some cases, validation/cancelation of the configured resources may be further based on a SFI that is provided with the COT indication, as discussed herein.

Figure 7:
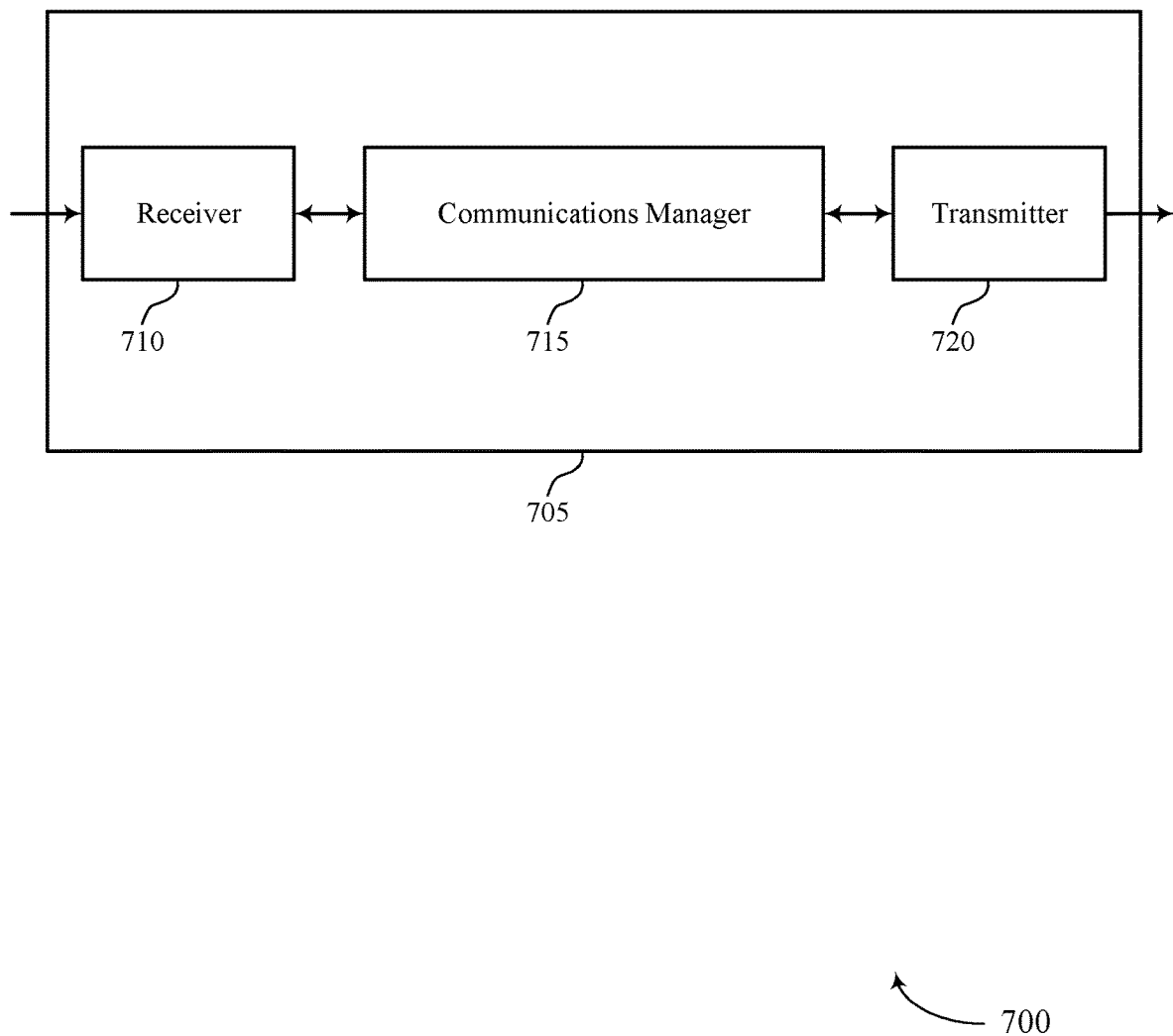
FIGS. 7 and 8 show block diagrams of devices that support configured communications techniques in shared radio frequency spectrum based on channel occupancy time in accordance with aspects of the present disclosure.

FIG. 7 shows a block diagram 700 of a device 705 that supports configured communications techniques in shared radio frequency spectrum based on channel occupancy time in accordance with aspects of the present disclosure. The device 705 may be an example of aspects of a UE 115 as described herein. The device 705 may include a receiver 710, a communications manager 715, and a transmitter 720.

The device 705 may also include a processor. Each of these components may be in communication with one another (e.g., via one or more buses).

The receiver 710 may receive information such as packets, user data, or control information associated with various information channels (e.g., control channels, data channels, and information related to configured communications techniques in shared radio frequency spectrum based on channel occupancy time, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, configuration information that indicates wireless resources for a set of communications with the base station, each of the set of communications having an associated wireless resource that includes a time domain resource and a frequency domain resource, monitor for a channel occupancy time indication from the base station that indicates wireless resources within a shared radio frequency spectrum band that are reserved by the base station, and determine whether to cancel a first communication of the set of communications based on one or more of the channel occupancy time indication being undetected, or a first wireless resource of the first communication being outside of the wireless resources indicated in a detected channel occupancy time indication. The communications manager 715 may be an example of aspects of the communications manager 1010 described herein.

The communications manager 715 may as described herein be implemented to realize one or more potential advantages. One implementation may allow the device 705 to perform validation or cancellation of configured resources based on a COT indication, which may provide enhanced efficiency and reduced power consumption associated with configured resources that are not to be used. Further, implementations may allow the device 705 to increase throughput, and enhance user experience, while reducing power consumption associated with configured communications, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
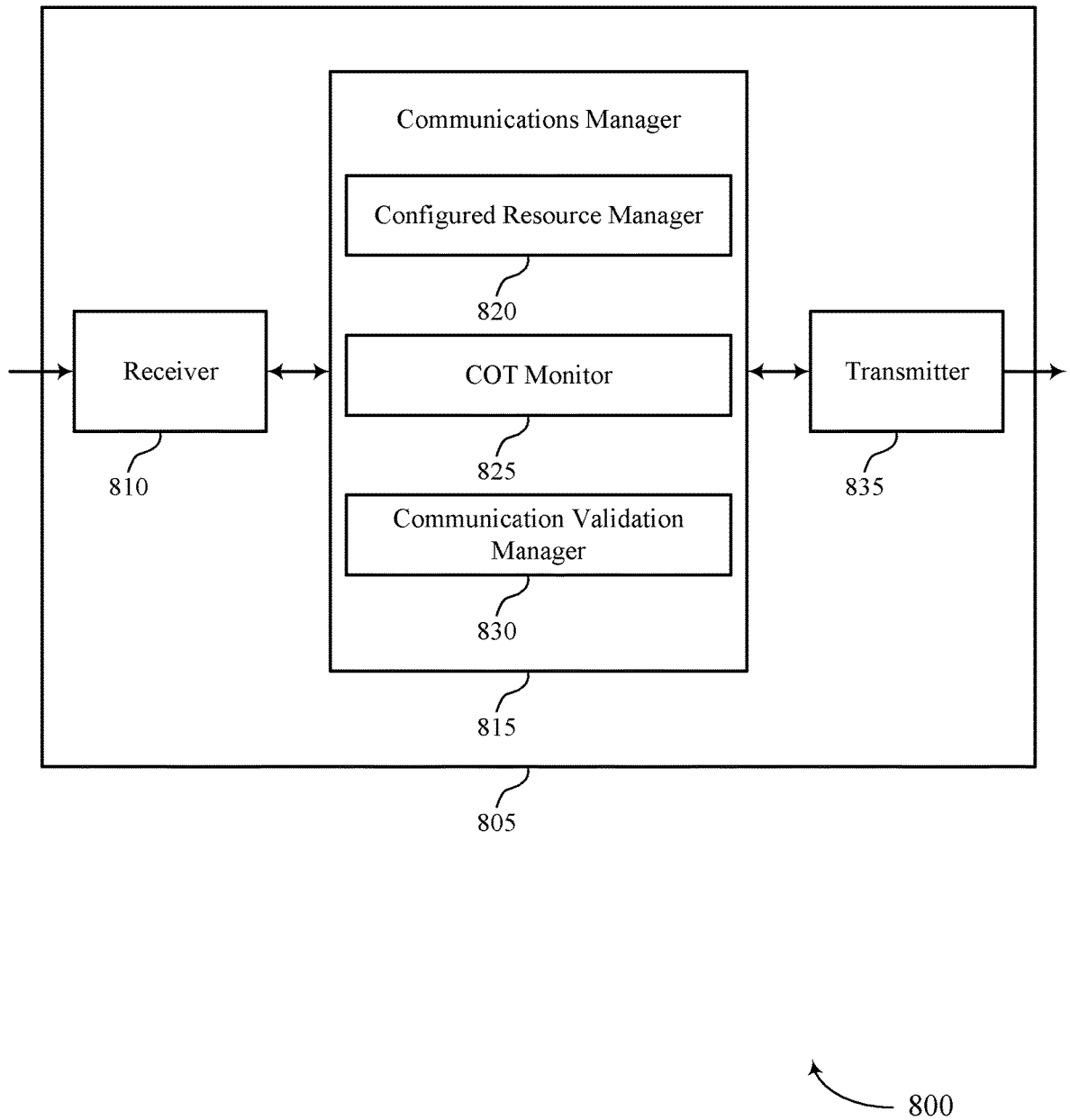

FIG. 8 shows a block diagram 800 of a device 805 that supports configured communications techniques in shared radio frequency spectrum based on channel occupancy time in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to configured communications techniques in shared radio frequency spectrum based on channel occupancy time, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configured resource manager 820, a COT monitor 825, and a communication validation manager 830. The communications manager 815 may be an example of aspects of the communications manager 1010 described herein.

The configured resource manager 820 may receive, from a base station, configuration information that indicates wireless resources for a set of communications with the base station, each of the set of communications having an associated wireless resource that includes a time domain resource and a frequency domain resource.

The COT monitor 825 may monitor for a channel occupancy time indication from the base station that indicates wireless resources within a shared radio frequency spectrum band that are reserved by the base station.

The communication validation manager 830 may determine whether to cancel a first communication of the set of communications based on one or more of the channel occupancy time indication being undetected, or a first wireless resource of the first communication being outside of the wireless resources indicated in a detected channel occupancy time indication.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
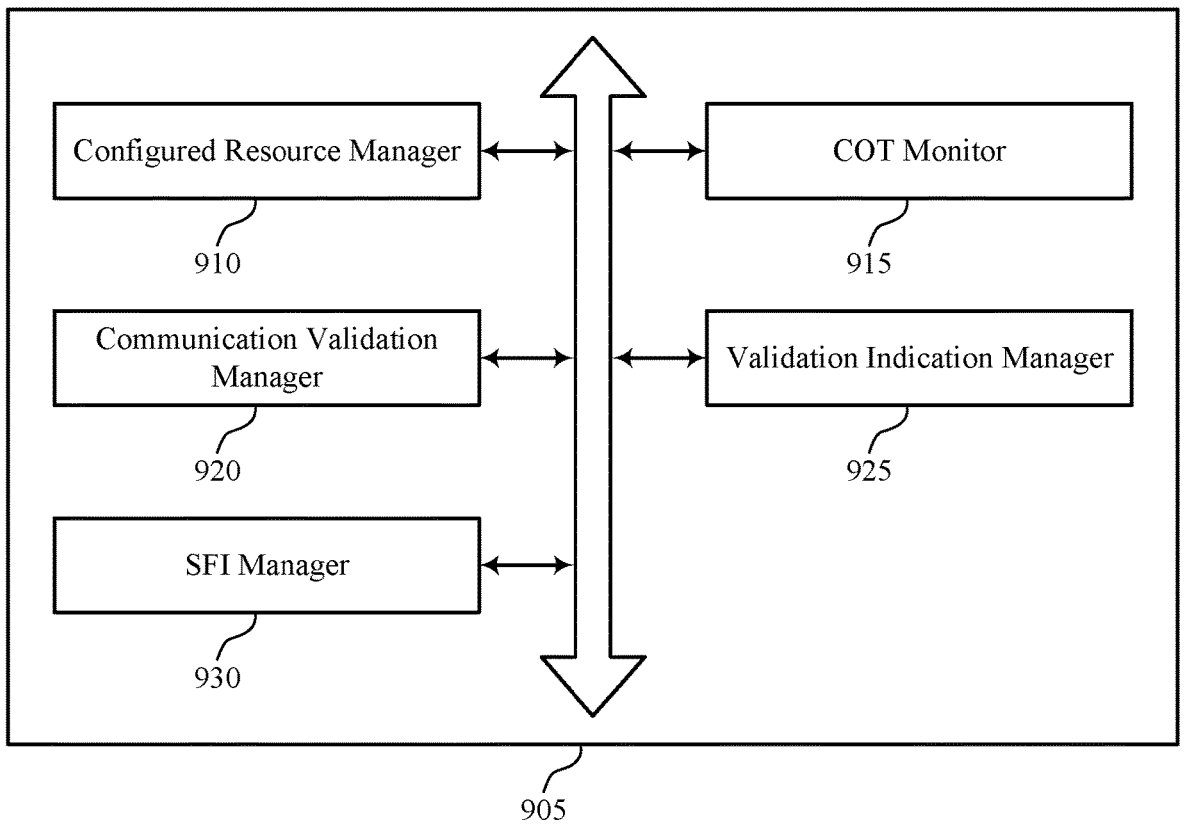
FIG. 9 shows a block diagram of a communications manager that supports configured communications techniques in shared radio frequency spectrum based on channel occupancy time in accordance with aspects of the present disclosure.

FIG. 9 shows a block diagram 900 of a communications manager 905 that supports configured communications techniques in shared radio frequency spectrum based on channel occupancy time in accordance with aspects of the present disclosure. The communications manager 905 may be an example of aspects of a communications manager 715, a communications manager 815, or a communications manager 1010 described herein. The communications manager 905 may include a configured resource manager 910, a COT monitor 915, a communication validation manager 920, a validation indication manager 925, and a SFI manager 930. Each of these modules may communicate, directly or indirectly, with one another (e.g., via one or more buses).

The configured resource manager 910 may receive, from a base station, configuration information that indicates wireless resources for a set of communications with the base station, each of the set of communications having an associated wireless resource that includes a time domain resource and a frequency domain resource. In some cases, the configuration information is provided in RRC signaling that configures a set of periodic uplink transmissions, a set of periodic downlink transmissions, or combinations thereof. In some cases, the configuration information includes a validation indication that enables the determining whether to cancel based on the channel occupancy time indication. In some cases, the configuration information includes a common validation indication that both uplink and downlink communications are to be canceled when the channel occupancy time indication is undetected. In some cases, the configuration information further indicates whether the set of communications with the base station are conditioned on detection of the channel occupancy time indication. In some cases, the configuration information further indicates a first set of wireless resources in which associated configured communications are transmitted irrespective of detection of the channel occupancy time indication, and a second set of wireless resources in which associated configured communications are conditioned on detection of the channel occupancy time indication.

The COT monitor 915 may monitor for a channel occupancy time indication from the base station that indicates wireless resources within a shared radio frequency spectrum band that are reserved by the base station.

The communication validation manager 920 may determine whether to cancel a first communication of the set of communications based on one or more of the channel occupancy time indication being undetected, or a first wireless resource of the first communication being outside of the wireless resources indicated in a detected channel occupancy time indication. In some cases, a detection of the channel occupancy time indication from the base station indicates that the base station is using a beam direction that enables communications between the UE and the base station. In some cases, the determining is further based on a timing of detection of the channel occupancy time indication, and where the first communication is canceled when the channel occupancy time indication is received less than a time threshold before a transmission time of the first communication. In some cases, the time threshold is a N2 time threshold that corresponds to a UE processing capability for a minimum time gap between receiving an uplink grant and transmitting a corresponding uplink shared channel communication. In some cases, the first communication is canceled when a transmission time of the first communication is outside of the indicated channel occupancy time, when a frequency resource of the first communication is outside of a frequency band of the indicated channel occupancy time, or combinations thereof.

The validation indication manager 925 may validate configured resources. In some cases, the configuration information includes an uplink validation indication that indicates whether uplink communications are to be canceled when the channel occupancy time indication is undetected, and a downlink validation indication that indicates whether downlink communications are to be canceled when the channel occupancy time indication is undetected.

The SFI manager 930 may receive, from the base station, a slot format indicator (SFI) that indicates a slot format associated with the channel occupancy time indication, the SFI indicating a transmission direction of a set of symbols within the channel occupancy time. In some examples, the SFI manager 930 may where the determining is further based on comparing a transmission direction of a first symbol of the first communication with a corresponding transmission direction indicated for the first symbol in the SFI.

Figure 10:
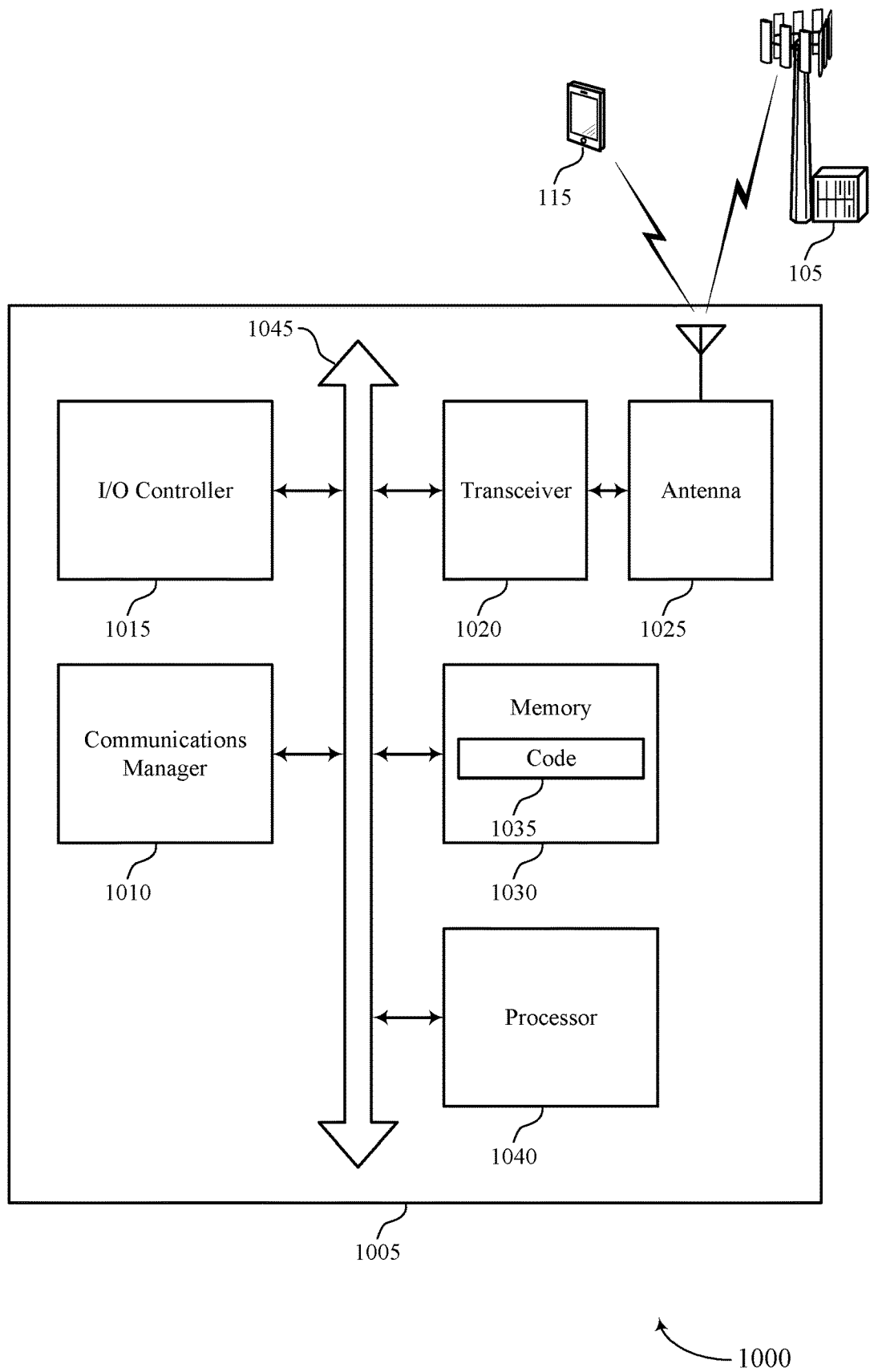
FIG. 10 shows a diagram of a system including a device that supports configured communications techniques in shared radio frequency spectrum based on channel occupancy time in accordance with aspects of the present disclosure.

FIG. 10 shows a diagram of a system 1000 including a device 1005 that supports configured communications techniques in shared radio frequency spectrum based on channel occupancy time in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, configuration information that indicates wireless resources for a set of communications with the base station, each of the set of communications having an associated wireless resource that includes a time domain resource and a frequency domain resource, monitor for a channel occupancy time indication from the base station that indicates wireless resources within a shared radio frequency spectrum band that are reserved by the base station, and determine whether to cancel a first communication of the set of communications based on one or more of the channel occupancy time indication being undetected, or a first wireless resource of the first communication being outside of the wireless resources indicated in a detected channel occupancy time indication.

The communications manager 1010 may as described herein be implemented to realize one or more potential advantages. One implementation may allow the device 1005 to perform validation or cancellation of configured resources based on a COT indication, which may provide enhanced efficiency and reduced power consumption associated with configured resources that are not to be used. Further, implementations may allow the device 1005 to increase throughput, and enhance user experience, while reducing power consumption associated with configured communications, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configured communications techniques in shared radio frequency spectrum based on channel occupancy time).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
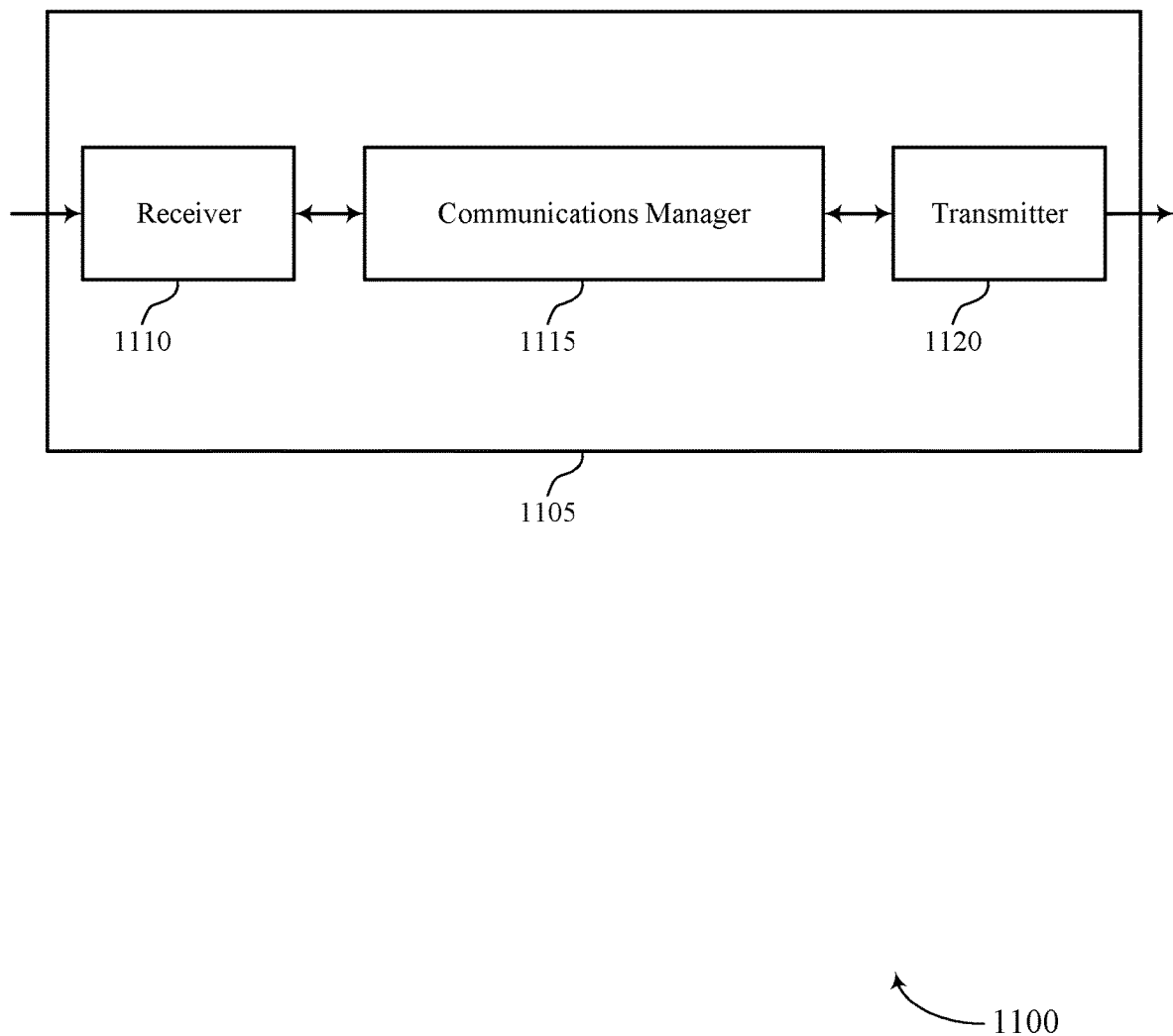
FIGS. 11 and 12 show block diagrams of devices that support configured communications techniques in shared radio frequency spectrum based on channel occupancy time in accordance with aspects of the present disclosure.

FIG. 11 shows a block diagram 1100 of a device 1105 that supports configured communications techniques in shared radio frequency spectrum based on channel occupancy time in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to configured communications techniques in shared radio frequency spectrum based on channel occupancy time, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to at least a first UE, configuration information that indicates wireless resources for a set of communications between the base station and the UE, each of the set of communications having an associated wireless resource that includes a time domain resource and a frequency domain resource, perform a listen-before-talk procedure to determine an availability of a shared radio frequency spectrum band for at least a first communication of the set of communications, and transmit, responsive to determining that the shared radio frequency spectrum band is available for at least the first communication, a channel occupancy time indication to at least the first UE, where the channel occupancy time indication is used to determine whether to cancel the first communication. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
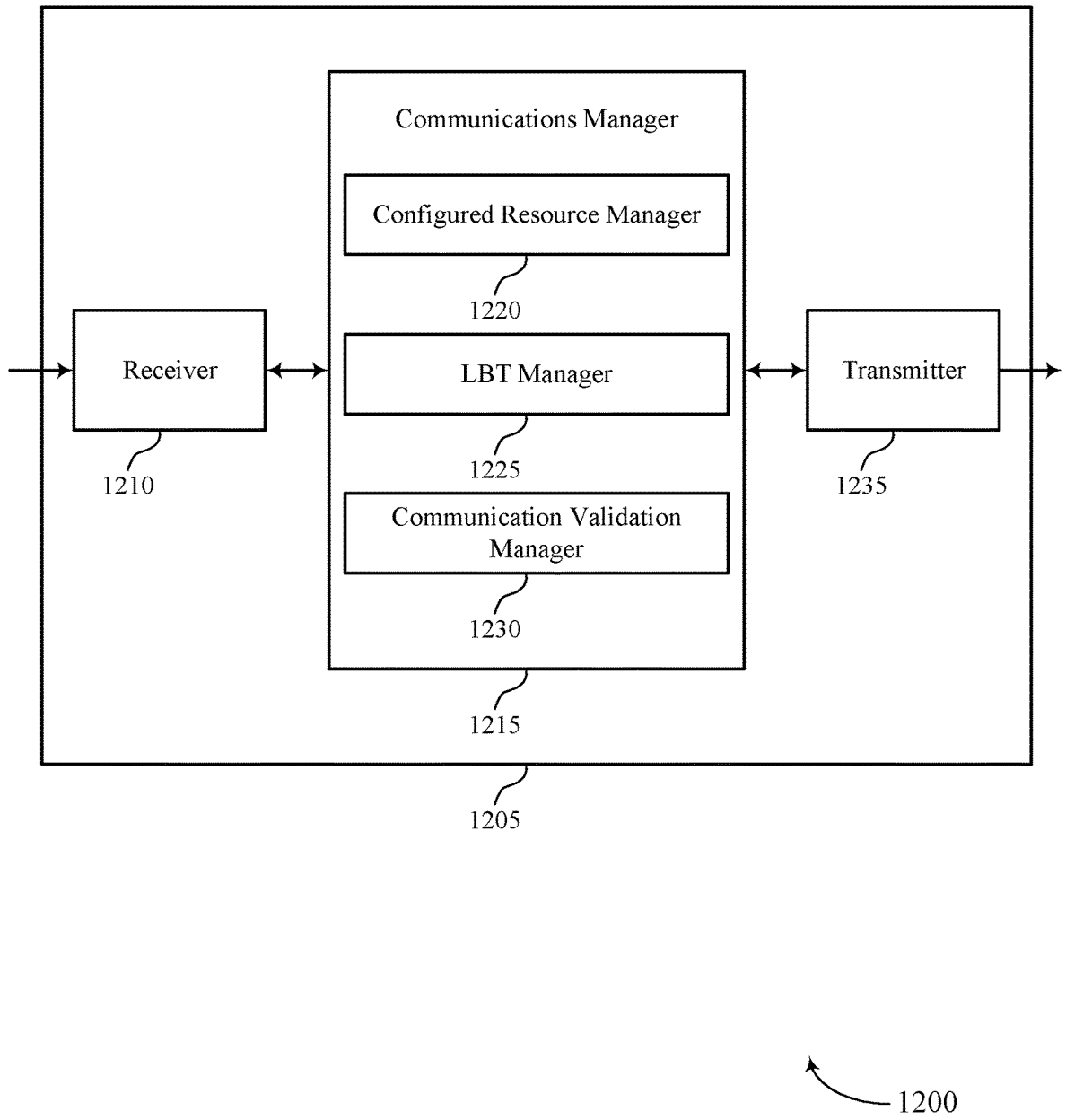

FIG. 12 shows a block diagram 1200 of a device 1205 that supports configured communications techniques in shared radio frequency spectrum based on channel occupancy time in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to configured communications techniques in shared radio frequency spectrum based on channel occupancy time, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configured resource manager 1220, a LBT manager 1225, and a communication validation manager 1230. The communications manager 1215 may be an example of aspects of the communications manager 1410 described herein.

The configured resource manager 1220 may transmit, to at least a first UE, configuration information that indicates wireless resources for a set of communications between the base station and the UE, each of the set of communications having an associated wireless resource that includes a time domain resource and a frequency domain resource.

The LBT manager 1225 may perform a listen-before-talk procedure to determine an availability of a shared radio frequency spectrum band for at least a first communication of the set of communications.

The communication validation manager 1230 may transmit, responsive to determining that the shared radio frequency spectrum band is available for at least the first communication, a channel occupancy time indication to at least the first UE, where the channel occupancy time indication is used to determine whether to cancel the first communication.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
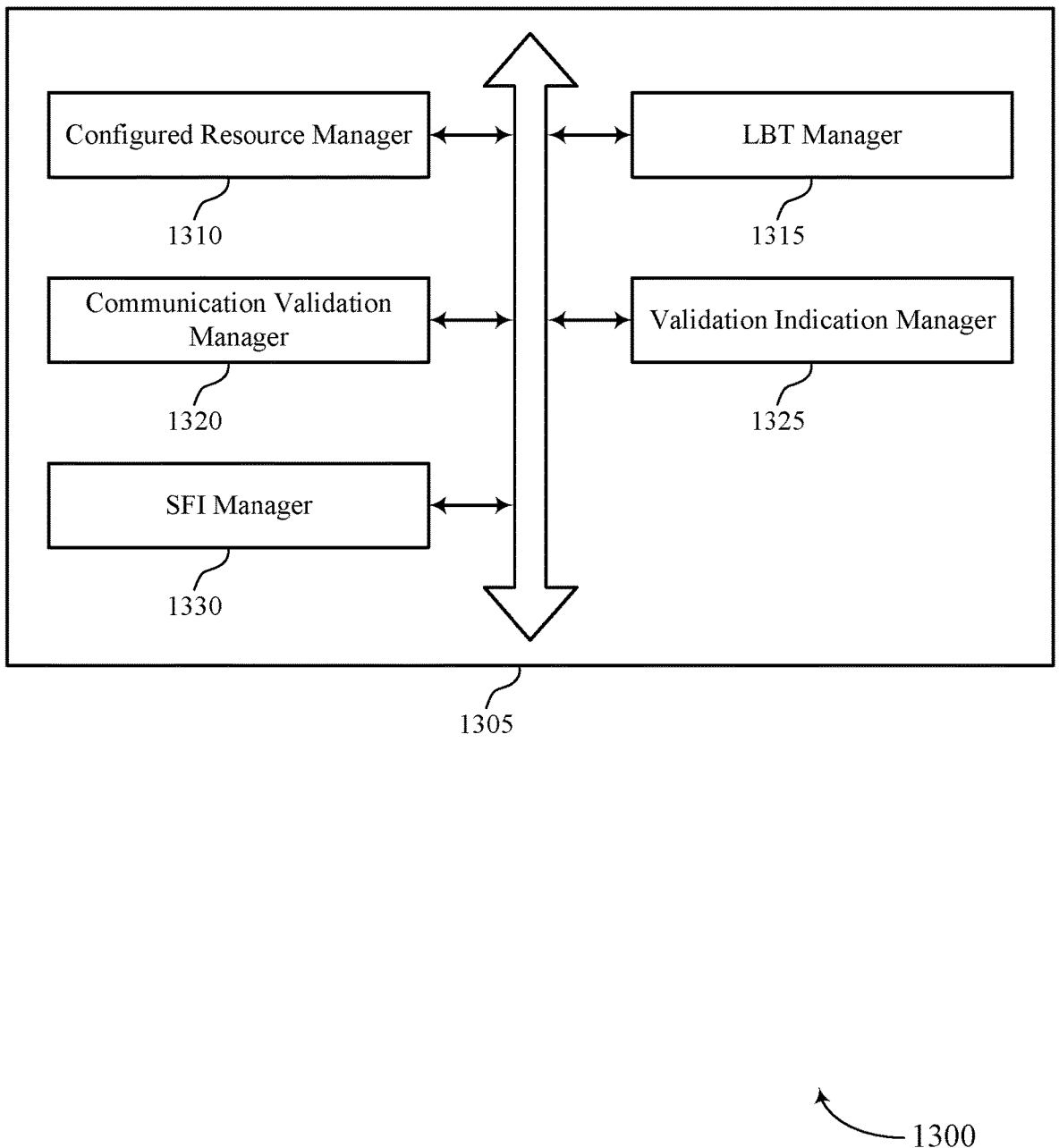
FIG. 13 shows a block diagram of a communications manager that supports configured communications techniques in shared radio frequency spectrum based on channel occupancy time in accordance with aspects of the present disclosure.

FIG. 13 shows a block diagram 1300 of a communications manager 1305 that supports configured communications techniques in shared radio frequency spectrum based on channel occupancy time in accordance with aspects of the present disclosure. The communications manager 1305 may be an example of aspects of a communications manager 1115, a communications manager 1215, or a communications manager 1410 described herein. The communications manager 1305 may include a configured resource manager 1310, a LBT manager 1315, a communication validation manager 1320, a validation indication manager 1325, and a SFI manager 1330. Each of these modules may communicate, directly or indirectly, with one another (e.g., via one or more buses).

The configured resource manager 1310 may transmit, to at least a first UE, configuration information that indicates wireless resources for a set of communications between the base station and the UE, each of the set of communications having an associated wireless resource that includes a time domain resource and a frequency domain resource. In some cases, the configuration information is provided in RRC signaling that configures a set of periodic uplink transmissions, a set of periodic downlink transmissions, or combinations thereof. In some cases, the configuration information includes a validation indication to the first UE that enables cancelling the first communication based on the channel occupancy time indication being undetected. In some cases, the configuration information includes a common validation indication that both uplink and downlink communications are to be canceled at the first UE when the channel occupancy time indication is undetected. In some cases, the configuration information further indicates whether the set of communications are conditioned on detection of the channel occupancy time indication by the first UE. In some cases, the configuration information further indicates a first set of wireless resources in which associated configured communications are transmitted irrespective of detection of the channel occupancy time indication, and a second set of wireless resources in which associated configured communications are conditioned on detection of the channel occupancy time indication.

The LBT manager 1315 may perform a listen-before-talk procedure to determine an availability of a shared radio frequency spectrum band for at least a first communication of the set of communications.

The communication validation manager 1320 may transmit, responsive to determining that the shared radio frequency spectrum band is available for at least the first communication, a channel occupancy time indication to at least the first UE, where the channel occupancy time indication is used to determine whether to cancel the first communication. In some cases, the configuration information further indicates a time threshold between the first communication and a timing of detection of the channel occupancy time indication, and where the first communication is canceled when the channel occupancy time indication is transmitted less than the time threshold before a transmission time of the first communication. In some cases, the time threshold is a N2 time threshold that corresponds to a UE processing capability for a minimum time gap between receiving an uplink grant and transmitting a corresponding uplink shared channel communication.

The validation indication manager 1325 may provide configuration for validation of configured resources based on COT indications. In some cases, the configuration information includes an uplink validation indication that indicates whether uplink communications are to be canceled at the first UE when the channel occupancy time indication is undetected, and a downlink validation indication that indicates whether downlink communications are to be canceled at the first UE when the channel occupancy time indication is undetected. In some cases, the channel occupancy time indication is transmitted from the base station in a beam direction associated with the indicated channel occupancy time, and where one or more UEs outside of the beam direction that do not detect the channel occupancy time indication are to cancel associated configured communications with the base station. In some cases, the first communication is canceled when a transmission time of the first communication is outside of the indicated channel occupancy time, when a frequency resource of the first communication is outside of a frequency band of the indicated channel occupancy time, or combinations thereof.

The SFI manager 1330 may transmit, to the first UE, a slot format indicator (SFI) that indicates a slot format associated with the channel occupancy time indication, the SFI indicating a transmission direction of a set of symbols within the channel occupancy time. In some examples, the SFI manager 1330 may determine whether the first communication is canceled based on comparing a transmission direction of a first symbol of the first communication with a corresponding transmission direction indicated for the first symbol in the SFI.

Figure 14:
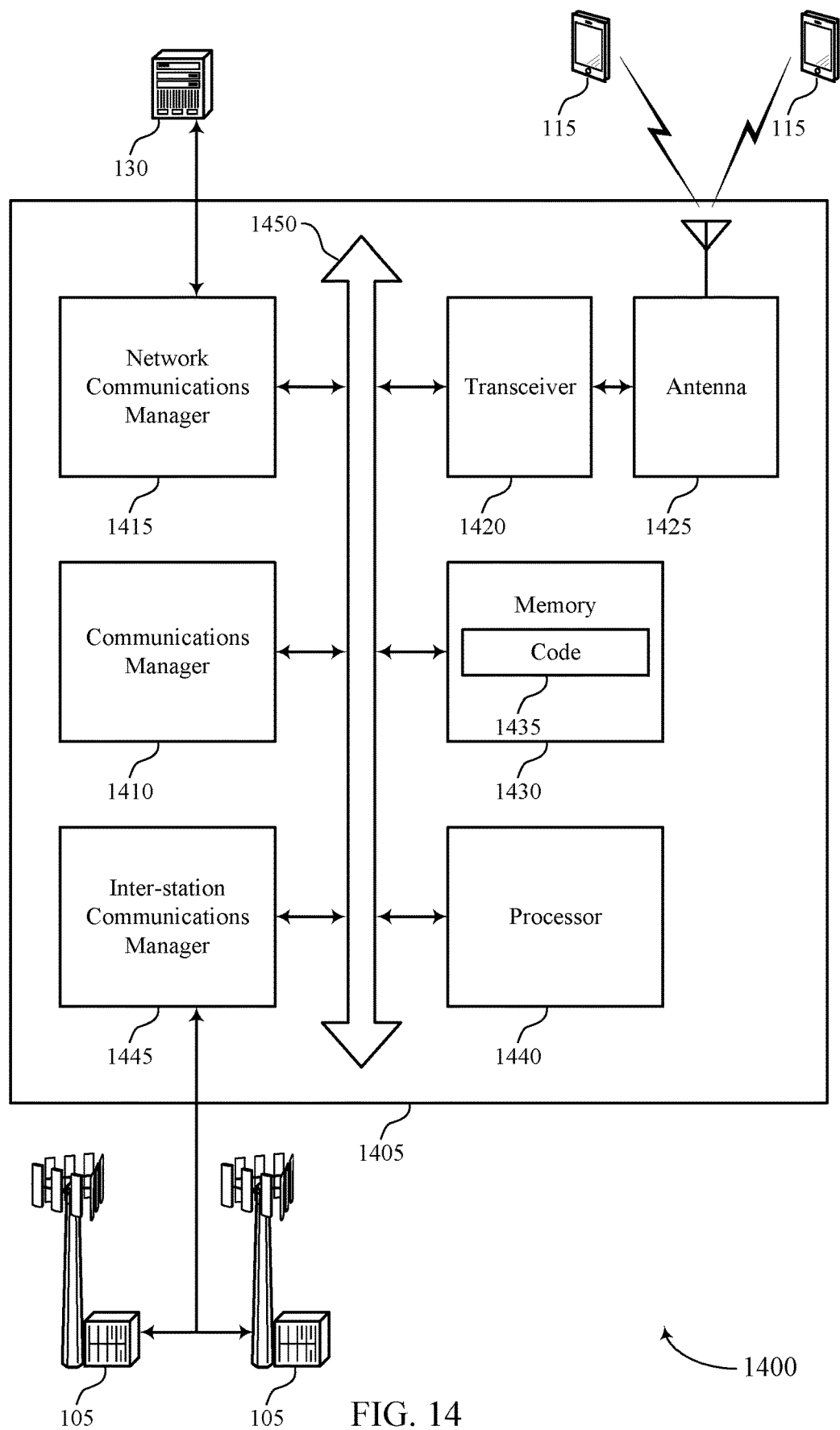
FIG. 14 shows a diagram of a system including a device that supports configured communications techniques in shared radio frequency spectrum based on channel occupancy time in accordance with aspects of the present disclosure.

FIG. 14 shows a diagram of a system 1400 including a device 1405 that supports configured communications techniques in shared radio frequency spectrum based on channel occupancy time in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to at least a first UE, configuration information that indicates wireless resources for a set of communications between the base station and the UE, each of the set of communications having an associated wireless resource that includes a time domain resource and a frequency domain resource, perform a listen-before-talk procedure to determine an availability of a shared radio frequency spectrum band for at least a first communication of the set of communications, and transmit, responsive to determining that the shared radio frequency spectrum band is available for at least the first communication, a channel occupancy time indication to at least the first UE, where the channel occupancy time indication is used to determine whether to cancel the first communication.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting configured communications techniques in shared radio frequency spectrum based on channel occupancy time).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
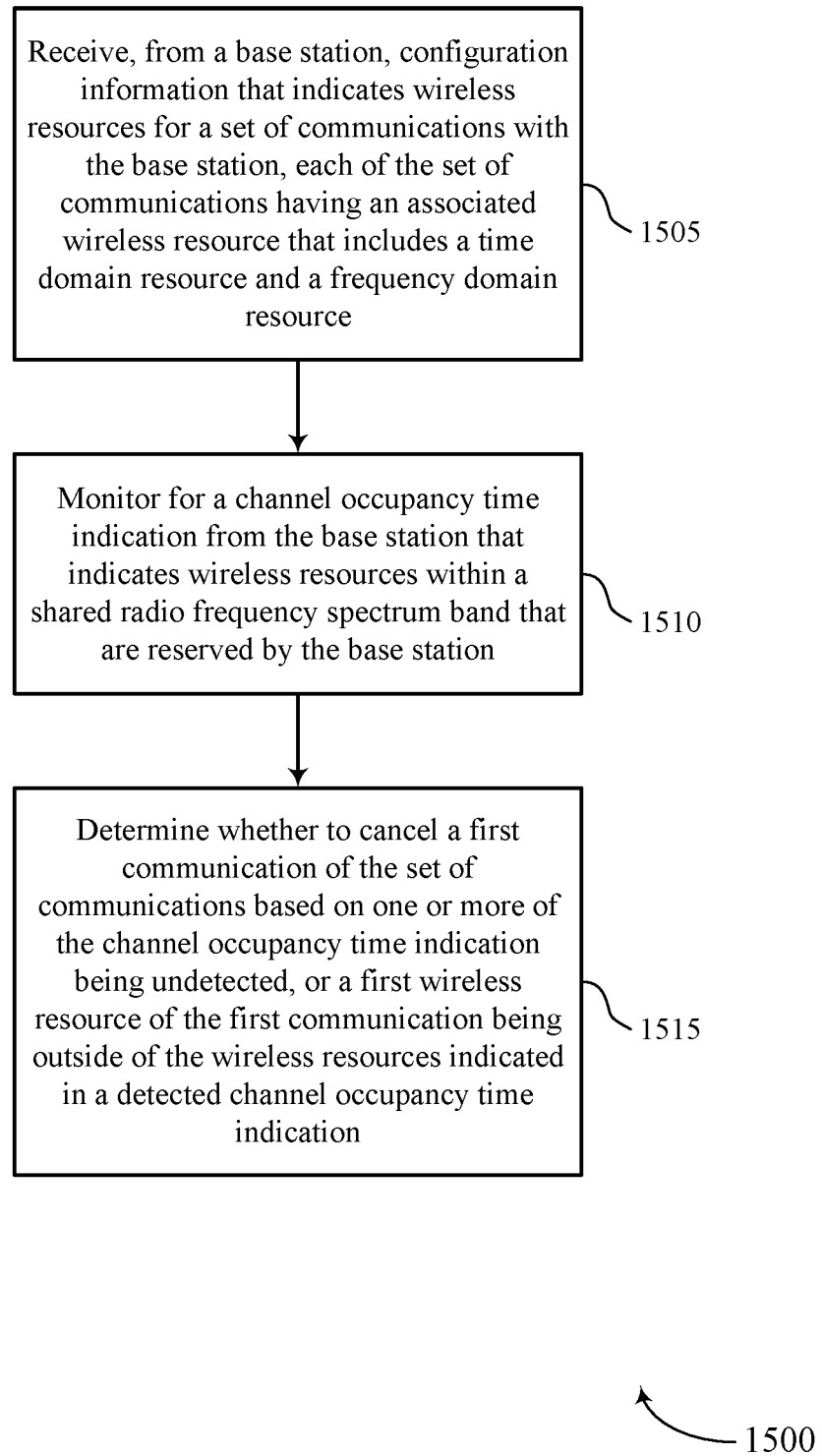
FIGS. 15 through 18 show flowcharts illustrating methods that support configured communications techniques in shared radio frequency spectrum based on channel occupancy time in accordance with aspects of the present disclosure.

FIG. 15 shows a flowchart illustrating a method 1500 that supports configured communications techniques in shared radio frequency spectrum based on channel occupancy time in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, configuration information that indicates wireless resources for a set of communications with the base station, each of the set of communications having an associated wireless resource that includes a time domain resource and a frequency domain resource. The operations of 1505 may be performed according to the methods described herein. In some examples, aspects of the operations of 1505 may be performed by a configured resource manager as described with reference to FIGS. 7 through 10.

At 1510, the UE may monitor for a channel occupancy time indication from the base station that indicates wireless resources within a shared radio frequency spectrum band that are reserved by the base station. The operations of 1510 may be performed according to the methods described herein. In some examples, aspects of the operations of 1510 may be performed by a COT monitor as described with reference to FIGS. 7 through 10.

At 1515, the UE may determine whether to cancel a first communication of the set of communications based on one or more of the channel occupancy time indication being undetected, or a first wireless resource of the first communication being outside of the wireless resources indicated in a detected channel occupancy time indication. The operations of 1515 may be performed according to the methods described herein. In some examples, aspects of the operations of 1515 may be performed by a communication validation manager as described with reference to FIGS. 7 through 10.

Figure 16:
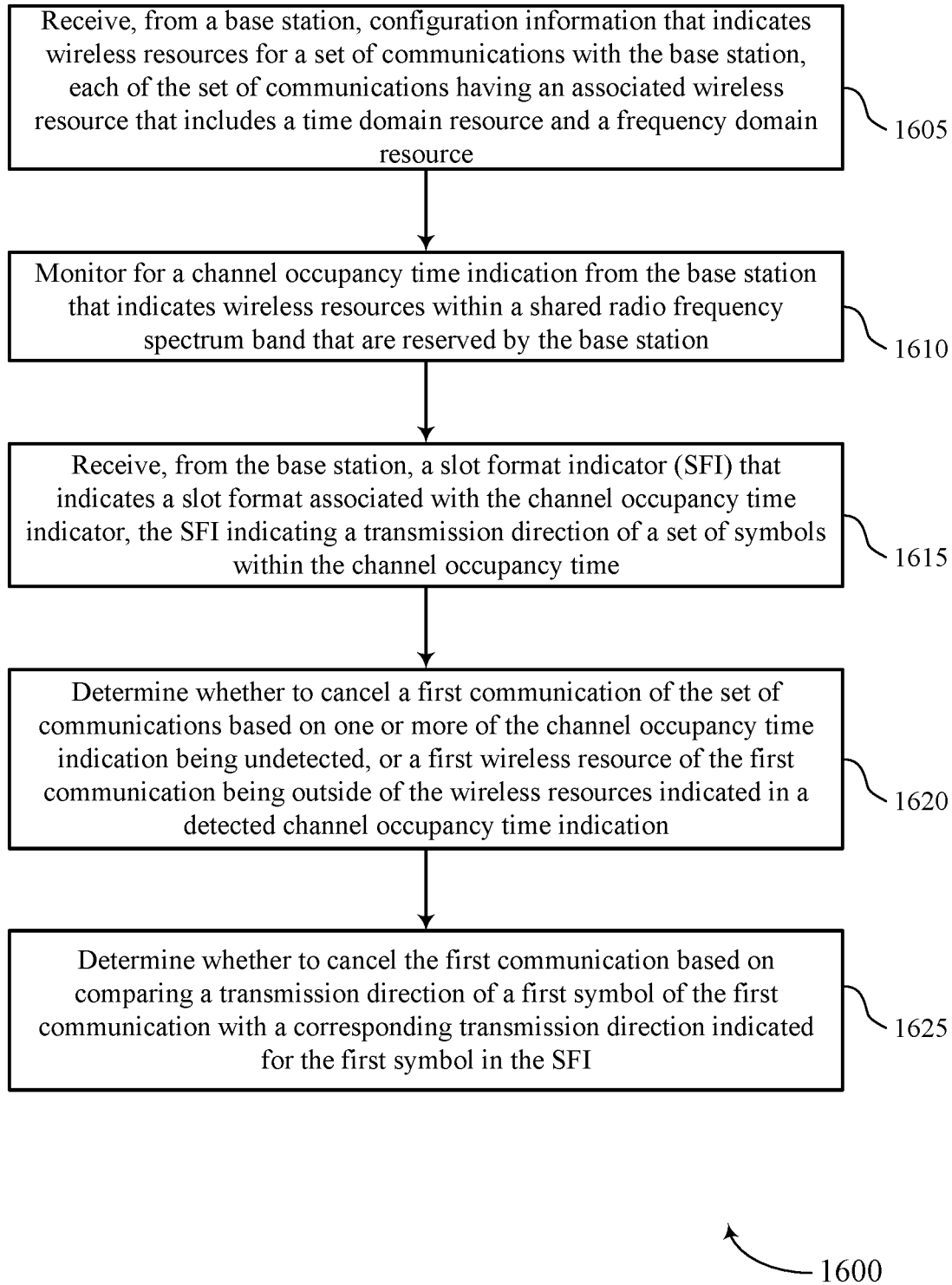

FIG. 16 shows a flowchart illustrating a method 1600 that supports configured communications techniques in shared radio frequency spectrum based on channel occupancy time in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information that indicates wireless resources for a set of communications with the base station, each of the set of communications having an associated wireless resource that includes a time domain resource and a frequency domain resource. The operations of 1605 may be performed according to the methods described herein. In some examples, aspects of the operations of 1605 may be performed by a configured resource manager as described with reference to FIGS. 7 through 10.

At 1610, the UE may monitor for a channel occupancy time indication from the base station that indicates wireless resources within a shared radio frequency spectrum band that are reserved by the base station. The operations of 1610 may be performed according to the methods described herein. In some examples, aspects of the operations of 1610 may be performed by a COT monitor as described with reference to FIGS. 7 through 10.

At 1615, the UE may receive, from the base station, a slot format indicator (SFI) that indicates a slot format associated with the channel occupancy time indication, the SFI indicating a transmission direction of a set of symbols within the channel occupancy time. The operations of 1615 may be performed according to the methods described herein. In some examples, aspects of the operations of 1615 may be performed by a SFI manager as described with reference to FIGS. 7 through 10.

At 1620, the UE may determine whether to cancel a first communication of the set of communications based on one or more of the channel occupancy time indication being undetected, or a first wireless resource of the first communication being outside of the wireless resources indicated in a detected channel occupancy time indication. The operations of 1620 may be performed according to the methods described herein. In some examples, aspects of the operations of 1620 may be performed by a communication validation manager as described with reference to FIGS. 7 through 10.

At 1625, the UE may determine whether to cancel the first communication based on comparing a transmission direction of a first symbol of the first communication with a corresponding transmission direction indicated for the first symbol in the SFI. The operations of 1625 may be performed according to the methods described herein. In some examples, aspects of the operations of 1625 may be performed by a SFI manager as described with reference to FIGS. 7 through 10.

Figure 17:
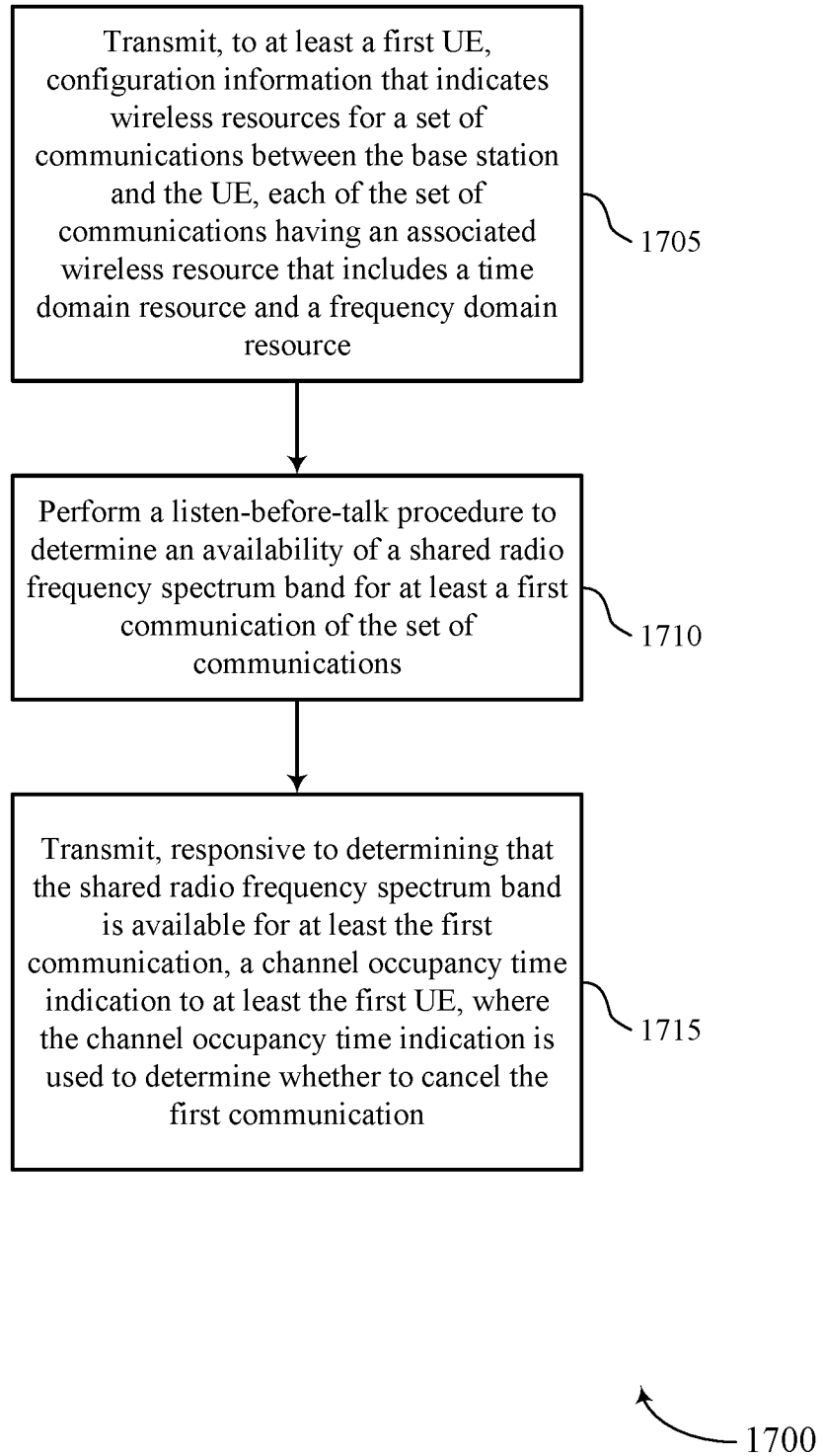

FIG. 17 shows a flowchart illustrating a method 1700 that supports configured communications techniques in shared radio frequency spectrum based on channel occupancy time in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, to at least a first UE, configuration information that indicates wireless resources for a set of communications between the base station and the UE, each of the set of communications having an associated wireless resource that includes a time domain resource and a frequency domain resource. The operations of 1705 may be performed according to the methods described herein. In some examples, aspects of the operations of 1705 may be performed by a configured resource manager as described with reference to FIGS. 11 through 14.

At 1710, the base station may perform a listen-before-talk procedure to determine an availability of a shared radio frequency spectrum band for at least a first communication of the set of communications. The operations of 1710 may be performed according to the methods described herein. In some examples, aspects of the operations of 1710 may be performed by a LBT manager as described with reference to FIGS. 11 through 14.

At 1715, the base station may transmit, responsive to determining that the shared radio frequency spectrum band is available for at least the first communication, a channel occupancy time indication to at least the first UE, where the channel occupancy time indication is used to determine whether to cancel the first communication. The operations of 1715 may be performed according to the methods described herein. In some examples, aspects of the operations of 1715 may be performed by a communication validation manager as described with reference to FIGS. 11 through 14.

Figure 18:
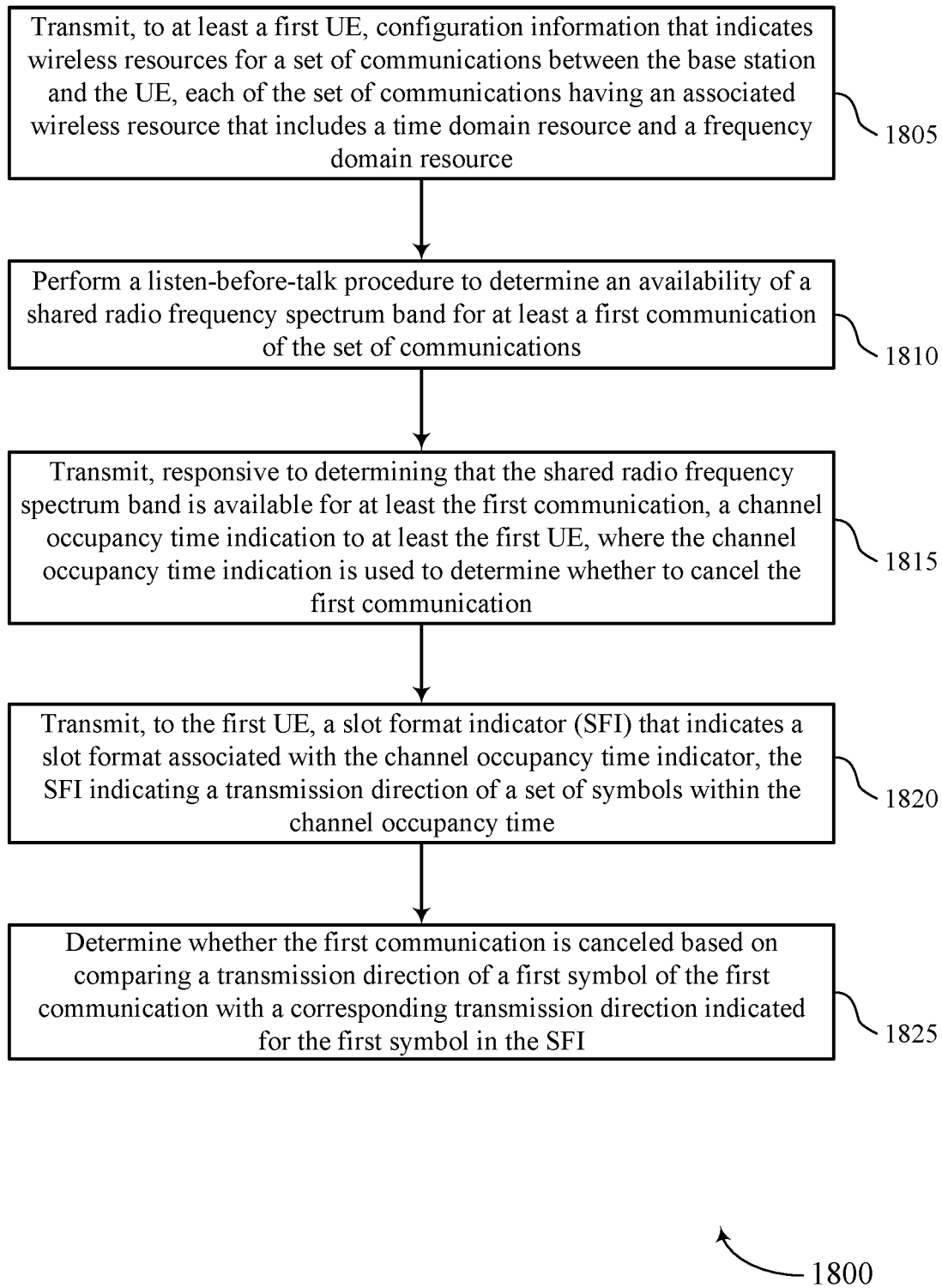

FIG. 18 shows a flowchart illustrating a method 1800 that supports configured communications techniques in shared radio frequency spectrum based on channel occupancy time in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to at least a first UE, configuration information that indicates wireless resources for a set of communications between the base station and the UE, each of the set of communications having an associated wireless resource that includes a time domain resource and a frequency domain resource. The operations of 1805 may be performed according to the methods described herein. In some examples, aspects of the operations of 1805 may be performed by a configured resource manager as described with reference to FIGS. 11 through 14.

At 1810, the base station may perform a listen-before-talk procedure to determine an availability of a shared radio frequency spectrum band for at least a first communication of the set of communications. The operations of 1810 may be performed according to the methods described herein. In some examples, aspects of the operations of 1810 may be performed by a LBT manager as described with reference to FIGS. 11 through 14.

At 1815, the base station may transmit, responsive to determining that the shared radio frequency spectrum band is available for at least the first communication, a channel occupancy time indication to at least the first UE, where the channel occupancy time indication is used to determine whether to cancel the first communication. The operations of 1815 may be performed according to the methods described herein. In some examples, aspects of the operations of 1815 may be performed by a communication validation manager as described with reference to FIGS. 11 through 14.

At 1820, the base station may transmit, to the first UE, a slot format indicator (SFI) that indicates a slot format associated with the channel occupancy time indication, the SFI indicating a transmission direction of a set of symbols within the channel occupancy time. The operations of 1820 may be performed according to the methods described herein. In some examples, aspects of the operations of 1820 may be performed by a SFI manager as described with reference to FIGS. 11 through 14.

At 1825, the base station may determine whether the first communication is canceled based on comparing a transmission direction of a first symbol of the first communication with a corresponding transmission direction indicated for the first symbol in the SFI. The operations of 1825 may be performed according to the methods described herein. In some examples, aspects of the operations of 1825 may be performed by a SFI manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving configuration information that indicates wireless resources for a plurality of communications with a base station, each of the plurality of communications having an associated wireless resource that includes a time domain resource and a frequency domain resource;
   monitoring for a channel occupancy time indication from the base station that indicates wireless resources within a shared radio frequency spectrum band that are reserved by the base station;
   determining whether to cancel a first communication of the plurality of communications based at least in part on one or more of the channel occupancy time indication being undetected, or a first wireless resource of the first communication being outside of the wireless resources indicated in a detected channel occupancy time indication; and
   canceling the first communication when the channel occupancy time indication is undetected or when the first wireless resource is outside of the wireless resources indicated in the detected channel occupancy time indication, wherein:
   the configuration information includes a common validation indication that both uplink and downlink communications are to be canceled when the channel occupancy time indication is undetected, or
   the configuration information includes an uplink validation indication that indicates whether uplink communications are to be canceled when the channel occupancy time indication is undetected, and a downlink validation indication that indicates whether downlink communications are to be canceled when the channel occupancy time indication is undetected.

2. The method of claim 1, wherein the configuration information is provided in signaling that configures a plurality of periodic uplink transmissions, a plurality of periodic downlink transmissions, or combinations thereof.

3. The method of claim 1, further comprising:
   receiving, from the base station, a slot format indicator (SFI) that indicates a slot format associated with the channel occupancy time indication, the SFI indicating a transmission direction of a plurality of symbols within a channel occupancy time indicated by the channel occupancy time indication; and
   wherein the determining is further based at least in part on comparing a transmission direction of a first symbol of the first communication with a corresponding transmission direction indicated for the first symbol in the SFI.

4. The method of claim 1, wherein a detection of the channel occupancy time indication from the base station indicates that the base station is using a beam direction that enables communications between the UE and the base station.

5. The method of claim 1, wherein the determining is further based at least in part on a timing of detection of the channel occupancy time indication, and wherein the first communication is canceled when the channel occupancy time indication is received less than a time threshold before a transmission time of the first communication.

6. The method of claim 5, wherein the time threshold is a N2 time threshold that corresponds to a UE processing capability for a minimum time gap between receiving an uplink grant and transmitting a corresponding uplink shared channel communication.

7. The method of claim 1, wherein the first communication is canceled when a transmission time of the first communication is outside of a channel occupancy time indicated by the channel occupancy time indication, when a frequency resource of the first communication is outside of a frequency band of the indicated channel occupancy time, or combinations thereof.

8. The method of claim 1, wherein the configuration information further indicates a first set of wireless resources in which associated configured communications are transmitted irrespective of detection of the channel occupancy time indication, and a second set of wireless resources in which associated configured communications are conditioned on detection of the channel occupancy time indication.

9. A method for wireless communication at a base station, comprising:
   transmitting, to at least a first user equipment (UE), configuration information that indicates wireless resources for a plurality of communications between the base station and the UE, each of the plurality of communications having an associated wireless resource that includes a time domain resource and a frequency domain resource;
   performing a listen-before-talk procedure to determine an availability of a shared radio frequency spectrum band for at least a first communication of the plurality of communications; and
   transmitting, responsive to determining that the shared radio frequency spectrum band is available for at least the first communication, a channel occupancy time indication to at least the first UE, wherein the channel occupancy time indication is used to determine whether to cancel the first communication, wherein:
   the configuration information includes a common validation indication that both uplink and downlink communications are to be canceled when the channel occupancy time indication is undetected, or
   the configuration information includes an uplink validation indication that indicates whether uplink communications are to be canceled when the channel occupancy time indication is undetected, and a downlink validation indication that indicates whether downlink communications are to be canceled when the channel occupancy time indication is undetected.

10. The method of claim 9, wherein the configuration information is provided in signaling that configures a plurality of periodic uplink transmissions, a plurality of periodic downlink transmissions, or combinations thereof.

11. The method of claim 9, further comprising:
transmitting, to the first UE, a slot format indicator (SFI) that indicates a slot format associated with the channel occupancy time indication, the SFI indicating a transmission direction of a plurality of symbols within a channel occupancy time indicated by the channel occupancy time indication, wherein the SFI is used to determine whether to cancel the first communication based at least in part on comparing a transmission direction of a first symbol of the first communication with a corresponding transmission direction indicated for the first symbol in the SFI.

12. The method of claim 9, wherein the channel occupancy time indication is transmitted from the base station in a beam direction associated with a channel occupancy time indicated by the channel occupancy time indication, and wherein one or more UEs outside of the beam direction that do not detect the channel occupancy time indication are to cancel associated configured communications with the base station.

13. The method of claim 9, wherein the configuration information further indicates a time threshold between the first communication and a timing of detection of the channel occupancy time indication, and wherein the time threshold is used to determine whether to cancel the first communication.

14. The method of claim 13, wherein the time threshold is a N2 time threshold that corresponds to a UE processing capability for a minimum time gap between receiving an uplink grant and transmitting a corresponding uplink shared channel communication.

15. The method of claim 9, wherein the first communication is to be canceled when a transmission time of the first communication is outside of a channel occupancy time indicated by the channel occupancy time indication, when a frequency resource of the first communication is outside of a frequency band of the indicated channel occupancy time, or combinations thereof.

16. The method of claim 9, wherein the configuration information further indicates a first set of wireless resources in which associated configured communications are to be transmitted irrespective of detection of the channel occupancy time indication, and a second set of wireless resources in which associated configured communications are conditioned on detection of the channel occupancy time indication.

17. An apparatus for wireless communication at a user equipment (UE), comprising:
a processor,
memory coupled with the processor; and
instructions stored in the memory and executable by the processor to cause the apparatus to:
receive configuration information that indicates wireless resources for a plurality of communications with a base station, each of the plurality of communications having an associated wireless resource that includes a time domain resource and a frequency domain resource;
monitor for a channel occupancy time indication from the base station that indicates wireless resources within a shared radio frequency spectrum band that are reserved by the base station;
determine whether to cancel a first communication of the plurality of communications based at least in part on one or more of the channel occupancy time indication being undetected, or a first wireless resource of the first communication being outside of the wireless resources indicated in a detected channel occupancy time indication; and
cancel the first communication when the channel occupancy time indication is undetected or when the first wireless resource is outside of the wireless resources indicated in the detected channel occupancy time indication, wherein:
the configuration information includes a common validation indication that both uplink and downlink communications are to be canceled when the channel occupancy time indication is undetected, or
the configuration information includes an uplink validation indication that indicates whether uplink communications are to be canceled when the channel occupancy time indication is undetected, and a downlink validation indication that indicates whether downlink communications are to be canceled when the channel occupancy time indication is undetected.

18. The apparatus of claim 17, wherein the configuration information is provided in signaling that configures a plurality of periodic uplink transmissions, a plurality of periodic downlink transmissions, or combinations thereof.

19. An apparatus for wireless communication at a base station, comprising:
a processor,
memory coupled with the processor; and
instructions stored in the memory and executable by the processor to cause the apparatus to:
transmit, to at least a first user equipment (UE), configuration information that indicates wireless resources for a plurality of communications between the base station and the UE, each of the plurality of communications having an associated wireless resource that includes a time domain resource and a frequency domain resource;
perform a listen-before-talk procedure to determine an availability of a shared radio frequency spectrum band for at least a first communication of the plurality of communications; and
transmit, responsive to determining that the shared radio frequency spectrum band is available for at least the first communication, a channel occupancy time indication to at least the first UE, wherein the channel occupancy time indication is used to determine whether to cancel the first communication, wherein:
the configuration information includes a common validation indication that both uplink and downlink communications are to be canceled when the channel occupancy time indication is undetected, or
the configuration information includes an uplink validation indication that indicates whether uplink communications are to be canceled when the channel occupancy time indication is undetected, and a downlink validation indication that indicates whether downlink communications are to be canceled when the channel occupancy time indication is undetected.

20. The apparatus of claim 19, wherein the configuration information is provided in signaling that configures a plurality of periodic uplink transmissions, a plurality of periodic downlink transmissions, or combinations thereof.

* * * * *